United States Patent
Iki

(10) Patent No.: US 9,793,773 B2
(45) Date of Patent: Oct. 17, 2017

(54) STATOR OF ELECTRIC ROTARY MACHINE AND FABRICATION METHOD THEREFOR

(71) Applicant: HONDA MOTOR CO., LTD., Tokyo (JP)

(72) Inventor: Tomotaka Iki, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 223 days.

(21) Appl. No.: 14/256,457

(22) Filed: Apr. 18, 2014

(65) Prior Publication Data

US 2014/0319960 A1 Oct. 30, 2014

(30) Foreign Application Priority Data

Apr. 24, 2013 (JP) ................................. 2013-091302

(51) Int. Cl.
| | |
|---|---|
| H02K 3/34 | (2006.01) |
| H02K 3/12 | (2006.01) |
| H02K 3/28 | (2006.01) |

(52) U.S. Cl.
CPC ............... H02K 3/12 (2013.01); H02K 3/28 (2013.01)

(58) Field of Classification Search
CPC ...................................................... H02K 3/12
USPC ................................. 310/216.114, 216.115
See application file for complete search history.

(56) References Cited

U.S. PATENT DOCUMENTS

| | | | |
|---|---|---|---|
| 6,400,059 B1* | 6/2002 | Hsu ........................ | H02K 1/148 310/254.1 |
| 6,700,282 B2* | 3/2004 | Mori .................. | H02K 15/0081 310/201 |
| 6,958,561 B2* | 10/2005 | Liao .......................... | H02K 3/12 29/596 |
| 9,362,809 B2* | 6/2016 | Kishi ........................ | H02K 3/12 |
| 2007/0007832 A1* | 1/2007 | Ichikawa ............ | H02K 15/0075 310/71 |
| 2007/0273218 A1 | 11/2007 | Atkinson | |

(Continued)

FOREIGN PATENT DOCUMENTS

| | | |
|---|---|---|
| CN | 102891547 A | 1/2013 |
| DE | 60115544 T2 | 8/2006 |

(Continued)

OTHER PUBLICATIONS

German Office Action dated Aug. 22, 2014, issued in corresponding DE patent application No. 102014207621.8 with English translation (17 pages).

Office Action dated Feb. 29, 2016, issued in counterpart Chinese Patent Application No. 201410152538.4, with Partial English translation. (10 pages).

(Continued)

*Primary Examiner* — Naishadh Desai
(74) *Attorney, Agent, or Firm* — Westerman, Hattori, daniels & Adrian, LLP

(57) ABSTRACT

One embodiment provides a stator of an electric rotary machine, including: a stator core having plural slots; a segmented coil of plural phases; and plural base plates laminated at each end of the stator core in an axial direction. While the stator core and plural coil bars of the segmented coil form a stator core assembly, and the plural base plates and plural end coil connections of the segmented coil form plural base plate assemblies. The stator is configured by the stator core assembly and the plural base plate assemblies laminated at each end of the stator core assembly.

10 Claims, 22 Drawing Sheets

(56) References Cited

U.S. PATENT DOCUMENTS

| | | | | |
|---|---|---|---|---|
| 2008/0143203 | A1* | 6/2008 | Purvines | H02K 1/148 310/71 |
| 2010/0001610 | A1* | 1/2010 | Iki | H02K 3/26 310/208 |
| 2011/0285224 | A1* | 11/2011 | Iki | H02K 3/47 310/64 |
| 2013/0020890 | A1* | 1/2013 | Iki | H02K 3/12 310/71 |
| 2013/0020891 | A1* | 1/2013 | Kishi | H02K 3/12 310/71 |
| 2013/0020901 | A1* | 1/2013 | Kishi | H02K 3/12 310/215 |
| 2013/0200743 | A1* | 8/2013 | Okimitsu | H02K 3/12 310/201 |

FOREIGN PATENT DOCUMENTS

| | | |
|---|---|---|
| DE | 102012212701 A1 | 1/2013 |
| JP | H07-039097 A | 2/1995 |
| JP | 2001-275288 A | 10/2001 |
| JP | 2002-51488 A | 2/2002 |
| JP | 2006-141076 A | 6/2006 |
| JP | 2010-239798 A | 10/2010 |
| JP | 2013-027172 A | 2/2013 |
| JP | 2013-091302 A | 5/2013 |

OTHER PUBLICATIONS

Office Action dated Aug. 30, 2016, issued in counterpart Japanese Application No. 2013-091302. (2 pages).

* cited by examiner

STATOR OF ELECTRIC ROTARY MACHINE AND FABRICATION METHOD THEREFOR

CROSS-REFERENCE TO RELATED APPLICATION(S)

This application claims priority from Japanese Patent Application No. 2013-091302 filed on Apr. 24, 2013, the entire contents of which are incorporated herein by reference.

FIELD

The embodiments described herein relate generally to a stator of an electric rotary machine which is installed in an electric vehicle, a hybrid vehicle or the like and a fabrication method therefor.

BACKGROUND

JP-2013-027172-A discloses a technique for a stator of a motor in which a segmented coil is used not only to suppress the height of a spanning portion while ensuring a high space factor but also to simplify the fabrication process. Specifically, as shown in FIG. 22, a stator 100 of an electric rotary machine includes a stator core assembly 101 which includes, in turn, a stator core 103 and plural coil bars 105 which are inserted individually in plural slots 104 in the stator core 103 and a pair of base plate assemblies 102 which include plural base plates 106 and plural end coil connections 107 which are individually disposed in the base plates 106 to form spanning portions to connect coil bars 105 of the same phase together. The pair of base plate assemblies 102 are disposed at axial ends of the stator core assembly 101.

In the field of electric rotary machines, it is general practice to increase the numbers of turns of coil or pole pairs as a specification of an electric rotary machine changes. However, in the stator 100 of the electric rotary machine of JP-2013-027172-A, when the numbers of turns of coil or pole pairs are attempted to be increased, the number of end coil connections 107 needs to be increased accordingly. Thus, it is necessary that the end coil connections 107 are made thinner or an outside diameter of the stator 100 is increased. When the number of end coil connections 107 is increased by making them thinner, since it is necessary to increase the number of insulation layers in association with the increase in the number of end coil connections 107, the space factor may be reduced. In addition, it may also affect the joining of the end coil connections 107 with the coil bars 105, which is not preferable from the viewpoint of fabrication of the stator. On the other hand, when the outside diameter of the stator 100 is increased, the installation properties of the electric rotary machine may be deteriorated, and the electric rotary machine may not satisfy the recent demand for reduction in size. Thus, there still remains room for improvement in the stator 100.

SUMMARY

One object of the embodiments is to provide a stator of an electric rotary machine which can increase the numbers of turns of coil or pole pairs while suppressing the increase in outside diameter of the stator or height in a spanning portion between coils and which can easily be fabricated, and a fabrication method therefor.

The embodiments provides following Aspects 1 to 8.

1. A stator (e.g., stators 10, 10A in embodiment) of an electric rotary machine, including:
   a stator core (e.g., a stator core 21 in embodiment) having plural slots (e.g., slots 23 in embodiment);
   a segmented coil (e.g., a coil 60 in embodiment) of plural phases; and
   plural base plates (e.g., first base plates 31L, 31R, second base plates 41L, 41R in embodiment) laminated at each end of the stator core in an axial direction,
   wherein the segmented coil includes
      plural coil bars (e.g., first coil bars 26, second coil bars 27 in embodiment) which are individually inserted in the plural slots in the stator core and which extend substantially straight and
      plural end coil connections (e.g., plural end coil connections 50 in embodiment) which are disposed on each of the base plates to form spanning portions to connect the coil bars of the same phase together,
   wherein the stator core and the plural coil bars form a stator core assembly (e.g., a stator core assembly 20 in embodiment),
   wherein the plural base plates and the plural end coil connections form plural base plate assemblies (e.g., first base plate assemblies 30L, 30R, second base plate assemblies 40L, 40R in embodiment), and
   wherein the stator is configured by the stator core assembly and the plural base plate assemblies laminated at each end of the stator core assembly.

2. The stator of Aspect 1,
   wherein at least a first and second coil bars (e.g., a first coil bar 26 and a second coil bar 27 in embodiment) are inserted in each of the slots in the stator core so as to be aligned radially with each other, and
   wherein the first and second coil bars are connected individually to the end coil connections of the different base plate assemblies.

3. The stator of Aspect 1 or 2,
   wherein the coil bars which are inserted in each of the slots in the stator core include
      a first coil bar which is inserted radially outwards and
      a second coil bar which is inserted radially inwards,
   wherein the first coil bar is connected to the end coil connection on a first base plate assembly (e.g., the first base plate assemblies 30L, 30R in embodiment) which is disposed axially outwards of the stator core assembly, and
   wherein the second coil bar is connected to the end coil connection on a second base plate assembly (e.g., the second base plate assemblies 40L, 40R in embodiment) which is disposed axially outwards of the first base plate assembly.

4. The stator of Aspect 3,
   wherein the second coil bar has an axial length which is longer than an axial length of the first coil bar.

5. The stator of Aspect 3 or 4,
   wherein an outside diameter (e.g., an outside diameter D2 in embodiment) of the second base plate assembly is smaller than an outside diameter (e.g., an outside diameter D1 in embodiment) of the first base plate assembly.

6. The stator of any one of Aspects 3 to 5,
   wherein an insulating member (e.g., an insulating sheet element 66 in embodiment) is interposed between the first base plate assembly and the second base plate assembly, the insulating member being locking the first base plate assembly and the second base plate assembly together and electrically insulating the end coil connections on the first base plate assembly and the end coil connections on the second base plate assembly from each other.

7. A fabrication method for a stator of an electric rotary machine including: a stator core having plural slots; a segmented coil of plural phases; and plural base plates laminated at each end of the stator core in an axial direction, wherein the segmented coil includes plural coil bars which are individually inserted in the plural slots in the stator core and which extend substantially straight and plural end coil connections which are disposed on each of the base plates to form spanning portions to connect the coil bars of the same phase together, the method including:

inserting the plural coil bars in the individual slots in the stator core to form a stator assembly;

disposing the plural end coil connections individually in the base plates to form plural base plate assemblies; and laminating the plural base plate assemblies to each side of the stator core assembly while interposing an insulating member therebetween to assemble them.

8. The method of Aspect 7, wherein the plural base plate assemblies are laminated together with another insulating member interposed therebetween.

According to Aspect 1, the number of turns of coil or pole pairs can be increased while suppressing the increase in outside diameter of the stator or height of the spanning portion of the coil and to execute the easy assemblage of the constituent components.

According to Aspect 2, the increase in height of the spanning portion of the coil can be suppressed while increasing the number of windings in the same slot.

According to Aspect 3, the second coil bar and the second base plate assembly can be easily assembled without being interrupted by the first coil bar and the first base plate assembly.

According to Aspect 4, the second coil bar projects axially further than the first base plate assembly, and the second coil bar and the second base plate assembly can be easily assembled after the first coil bar and the first base plate assembly are connected together.

According to Aspect 5, the volume of the stator becomes smaller, thereby enhancing the installation properties of the stator.

According to Aspect 6, the end coil connections on the first base plate assembly and the end coil connections on the second base plate assembly can be isolated electrically from each other.

According to Aspect 7, even though the number of turns of coil or pole pairs is increased, the stator can be formed without increasing the outside diameter of the stator or height in the spanning portion of the coil.

According to Aspect 8, the end coil connections of the plural base plate assemblies can be electrically isolated from each other.

DETAILED DESCRIPTION

First Embodiment

Figure 1:
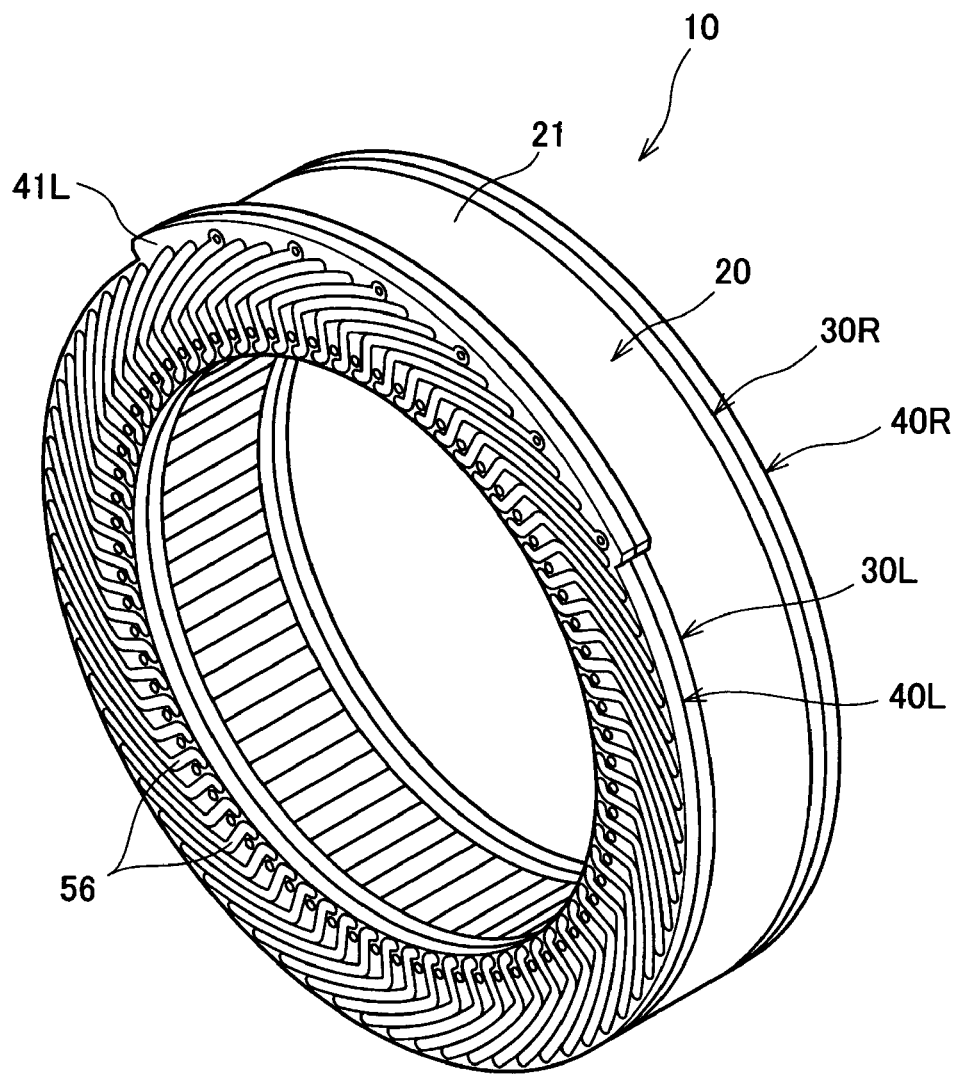
FIG. 1 is a perspective view of a stator of an electric rotary machine according to a first embodiment.
Figure 2:
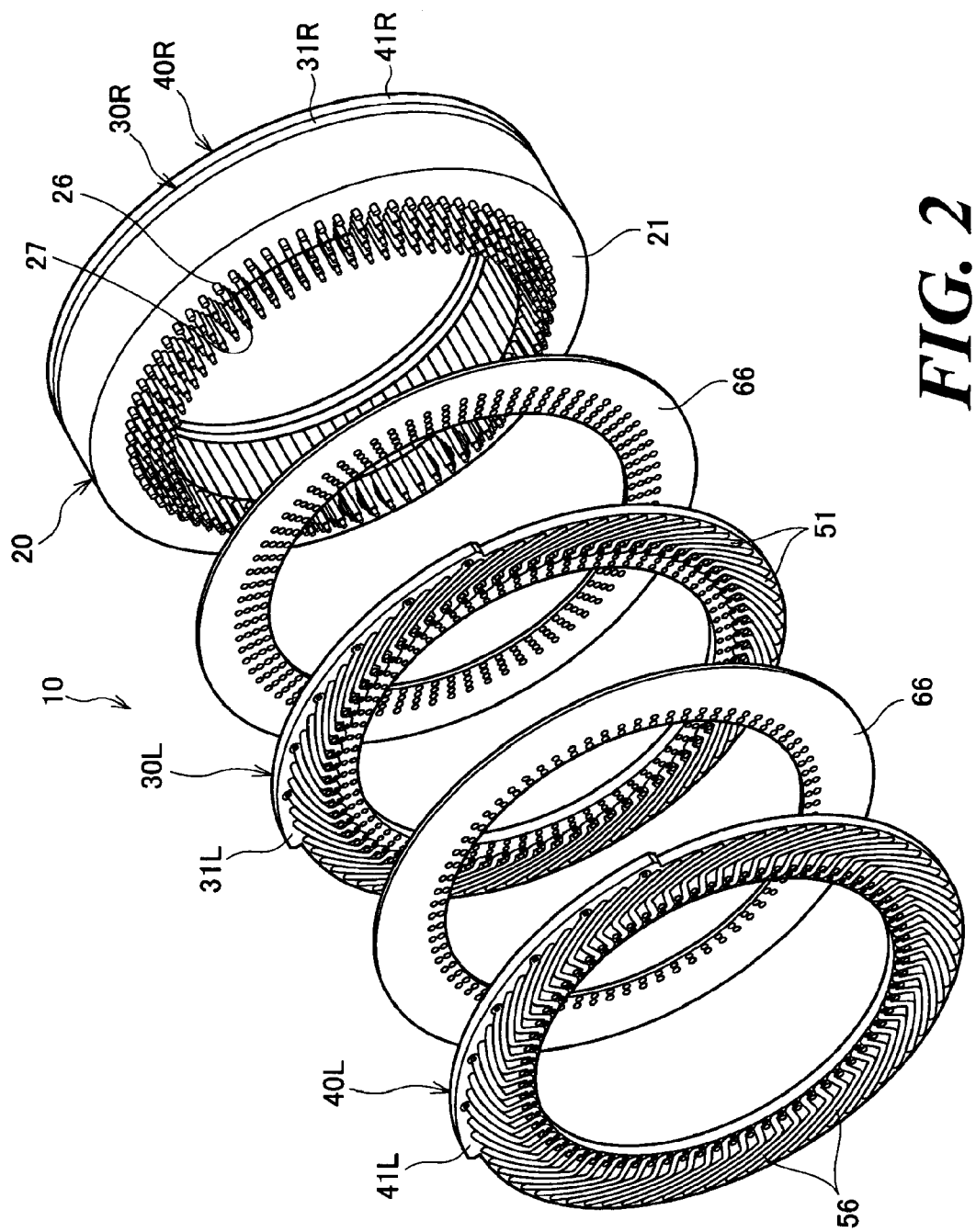
FIG. 2 is an exploded perspective view of the stator shown in FIG. 1.

A stator of an electric rotary machine according to a first embodiment will be described in detail based on the accompanying drawings. The drawings should be seen in directions in which given reference numerals look normally.

As shown in FIGS. 1, 2, 5 and 6, a stator 10 of an electric rotary machine of this embodiment is a six-pair, eight-turn double-slot type stator and includes a stator core assembly 20, a pair of first base plate assemblies 30L, 30R, and a pair of second base plate assemblies 40L, 40R. In this stator 10, the first and second base plate assemblies 30L, 30R, 40L, 40R are assembled to both ends of the stator core assembly 20 so as to be laminated together in an axial direction. Specifically, the pair of first base plate assemblies 30L, 30R are disposed individually at the axial ends of the stator core assembly 20, and the pair of second base plate assemblies 40L, 40R are disposed at axial outer sides of the first base plate assemblies 30L, 30R, respectively.

Annular insulating sheet elements 66 of silicone, for example, are disposed individually, between the stator core assembly 20 and the first base plate assemblies 30L, 30R and between the first base plate assemblies 30L, 30R and the second base plate assemblies 40L, 40R, so that the stator core assembly 20 and the first base plate assemblies 30L, 30R and the first base plate assemblies 30L, 30R and the second base plate assemblies 40L, 40R are electrically insulated from each other by the annular insulating sheet elements 66.

Figure 3:
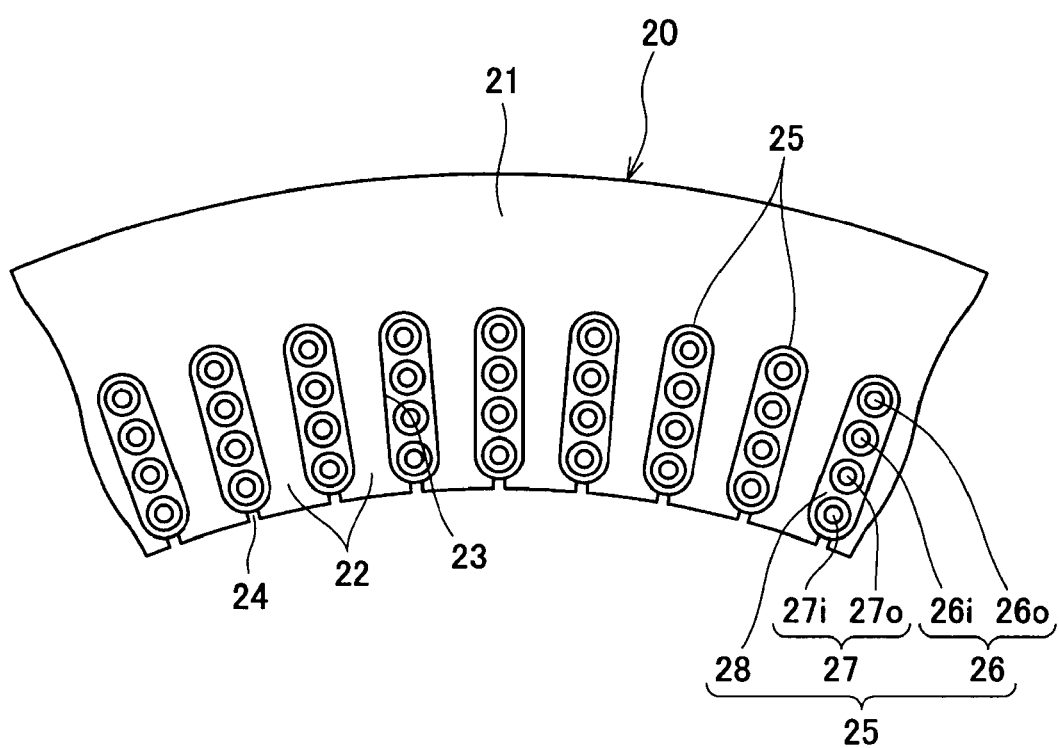
FIG. 3 is a partially enlarged side view of a stator core assembly.
Figure 4:
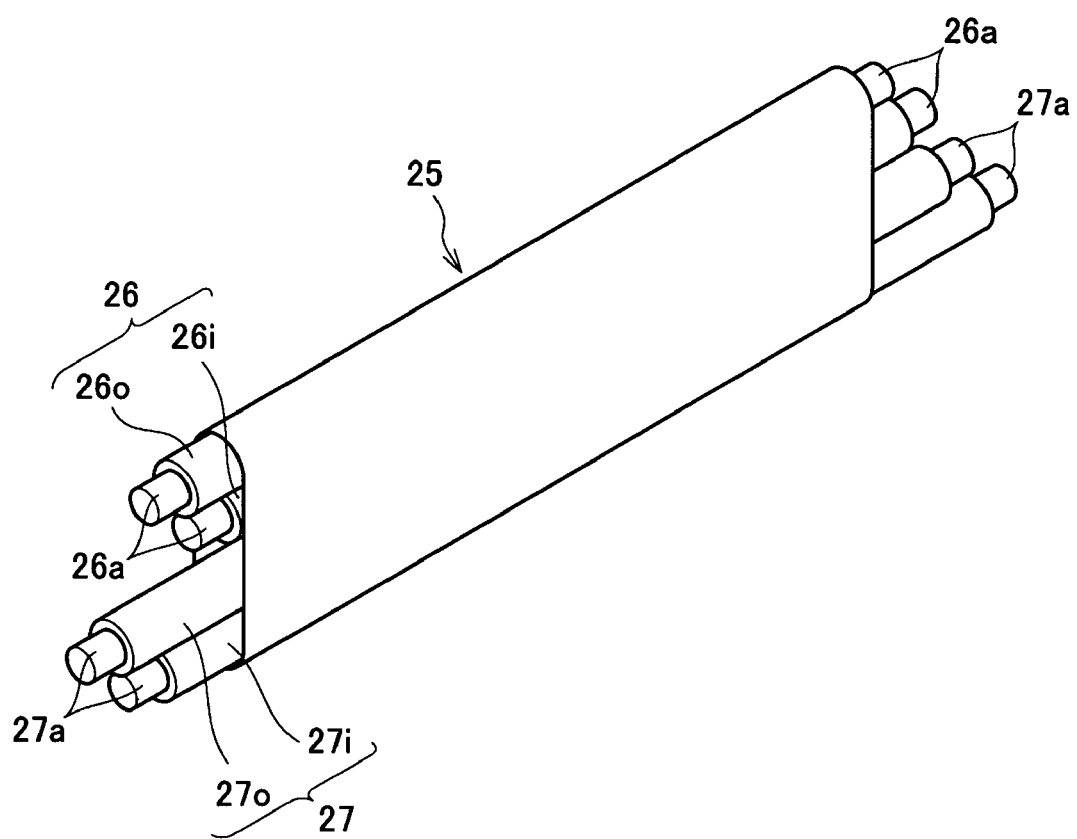
FIG. 4 is a perspective view of a coil bar assembly.

As shown in FIGS. 3 and 4, the stator core assembly 20 includes a stator core 21 and plural (72 in this embodiment shown in the figures) coil bar assemblies 25.

The stator core 21 is formed of a lamination of plural pressed-out silicon steel plates and includes 72 teeth 22 and 72 slots 23 which are defined between adjacent teeth 22, 22 on a radially inner side thereof. The slots 23 are formed so as to penetrate the stator core 21 axially and are each formed substantially into an elliptic shape which is long in a radial direction of the stator core 21 as viewed from an axial direction of the stator core 21, with opening portions 24 opened to an inner circumferential surface of the stator core 21.

As shown in FIG. 4, the coil bar assembly 25 includes a first coil bar 26 which includes, in turn, a first radially outer coil bar 26o and a first radially inner coil bar 26i and a second coil bar 27 which includes, in turn, a second radially outer coil bar 27o and a second radially inner coil bar 27i. The first radially outer coil bar 26o, the first radially inner coil bar 26i, the second radially outer coil bar 27o and the second radially inner coil bar 27i are disposed so as to be aligned into a straight line in that order and are then covered therearound by an insulating material 28 such as an injection molded resin, excluding ends thereof so as to be integrated into a single element. The second radially outer coil bar 27o and the second radially inner coil bar 27i are axially longer than the first radially outer coil bar 26o and the first radially inner coil bar 26i.

The first radially outer coil bar 26o and the first radially inner coil bar 26i have the same shape and the same length and are set to a length which is substantially the same as a sum of an axial length of the stator core 21 and a total thickness of three end coil connections 50, which will be described later. A small-diameter portion 26a having a length which is substantially the same as the thickness of the end coil connection 50 is formed at each end of the first radially outer and inner coil bars. The first radially outer coil bar 26o and the first radially inner coil bar 26i are disposed in parallel by being offset axially from each other by an amount equal to the thickness of the end coil connection 50.

The second radially outer coil bar 27o and the second radially inner coil bar 27i have the same shape and the same length and are set to a length which is substantially the same as a sum of the axial length of the stator core 21 and a total thickness of seven end coil connections 50. A small-diameter portion 27a having a length which is substantially the same as the thickness of the end coil connection 50 is formed at each end of the second radially outer and inner coil bars. The second radially outer coil bar 27o and the second radially inner coil bar 27i are disposed in parallel by being offset axially from each other by an amount equal to the thickness of the end coil connection 50.

As shown in FIG. 3, the oil bar assemblies 25 are aligned in a circumferential direction of the stator core 21 to be inserted individually in the 72 slots 23 in the stator core 21 so that the first coil bar 26 is disposed radially outwards and the second coil bar 27 is disposed radially inwards in each slot 23 to thereby form the stator core assembly 20.

Figure 5:
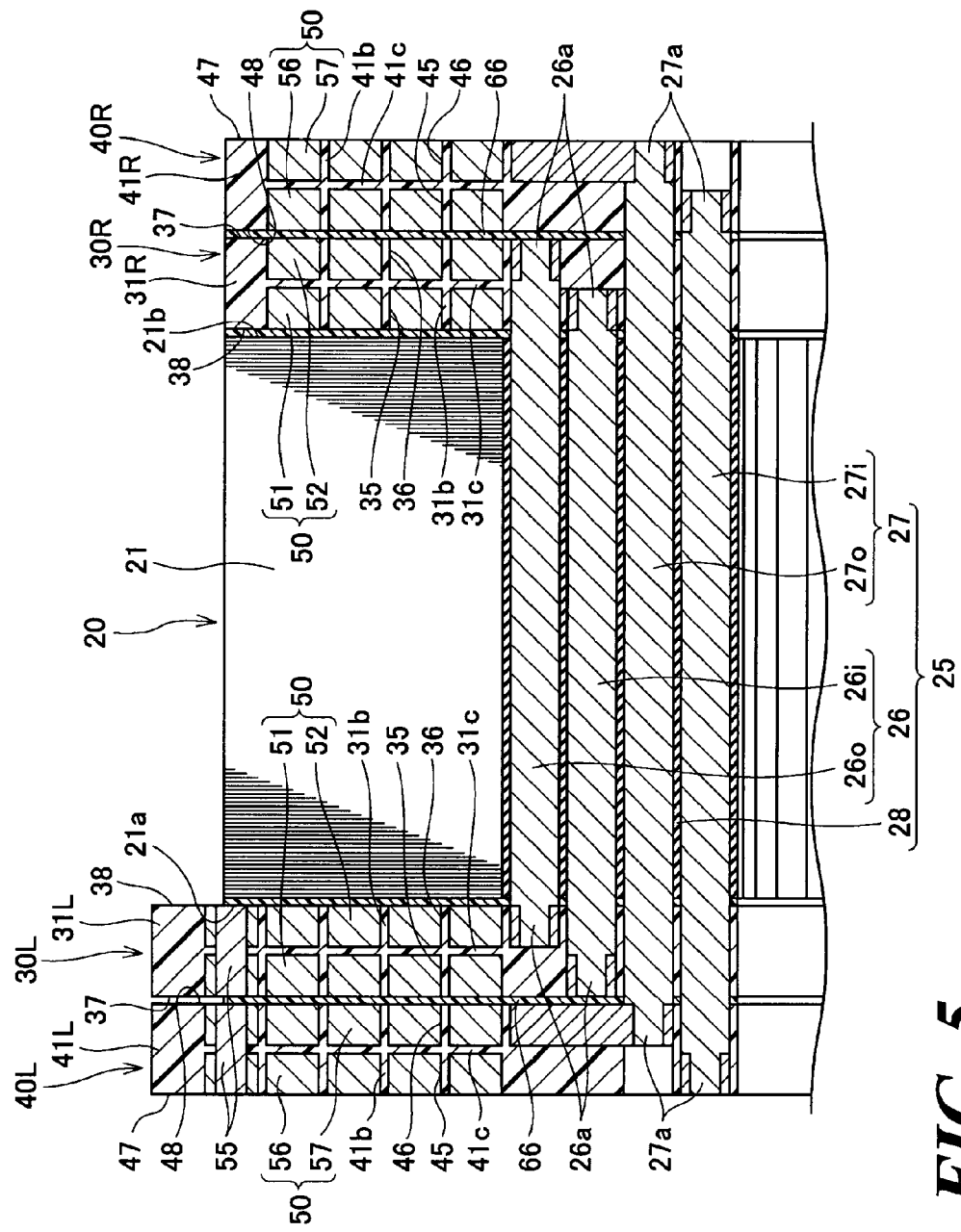
FIG. 5 is a vertical sectional view of the stator shown in FIG. 1.
Figure 6:
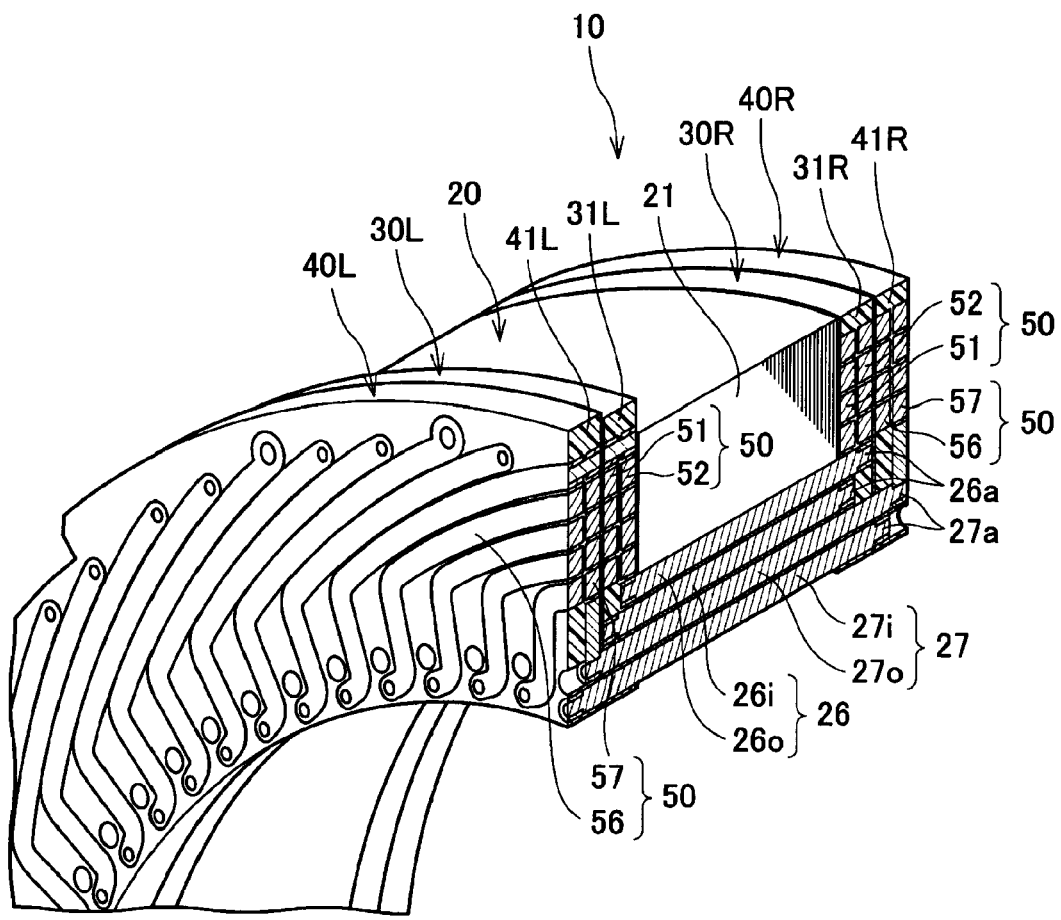
FIG. 6 is a perspective view showing part of the stator shown in FIG. 1 which is sectioned vertically.

As shown in FIGS. 5 and 6, when the coil bar assembly 25 is inserted in the slot 23 in the stator core 21, the first radially outer coil bar 26o is inserted in the slot 23 so that the small-diameter portion 26a projects from the end face 21a (a left end face in FIG. 5) of the stator core 21 by an amount substantially equal to the thickness of one end coil connection 50, while the small-end portion 26a projects from the other end face 21b (a right end face in FIG. 5) by an amount substantially equal to a total thickness of two end coil connections 50.

The first radially inner coil bar 26i is inserted in the slot 23 so that the small-diameter portion 26a projects from the one end face 21a of the stator core 21 by an amount substantially equal to a total thickness of two end coil connections 50, while the small-end portion 26a projects from the other end face 21b by an amount substantially equal to the thickness of one end coil connection 50.

The second radially outer coil bar 27o is inserted in the slot 23 so that the small-diameter portion 27a projects from the one end face 21a of the stator core 21 by an amount substantially equal to a total thickness of three end coil connections 50, while the small-end portion 27a projects from the other end face 21b by an amount substantially equal to a total thickness of four end coil connections 50.

The second radially inner coil bar 27i is inserted in the slot 23 so that the small-diameter portion 27a projects from the one end face 21a of the stator core 21 by an amount substantially equal to a total thickness of four end coil connections 50, while the small-end portion 27a projects from the other end face 21b by an amount substantially equal to a total thickness of three end coil connections 50.

In this way, the insulating material 28 which covers the first and second coil bars 26, 27 is interposed between both the coil bars 26, 27 and the slot 23 in the stator core 21, whereby the electrical insulation between the coil bars and the stator core 21 is ensured thereby. The first coil bar 26 and the second coil bar 27 are covered by the insulating material 28 such that the first coil bar 26 and the second coil bar 27 are offset axially from each other so that the end portions thereof take different axial positions.

The first base plate assemblies 30L, 30R include the first base plates 31L, 31R and plural end coil connections 50 which are assembled to the first base plates 31L, 31R, respectively. The second base plate assemblies 40L, 40R include the second base plates 41L, 41R and plural end coil connections 50 which are assembled to the second base plates 41L, 41R, respectively.

The first and second base plate assemblies 30R, 40R are the same as the first and second base plate assemblies 30L, 40L in the other configurations than those in which connecting terminal portions, which will be described later, are not provided and in which the shapes of grooves and end coil connections are different. Therefore, in the following description, the first and second base plate assemblies 30L, 40L will mainly be described.

Figure 7:
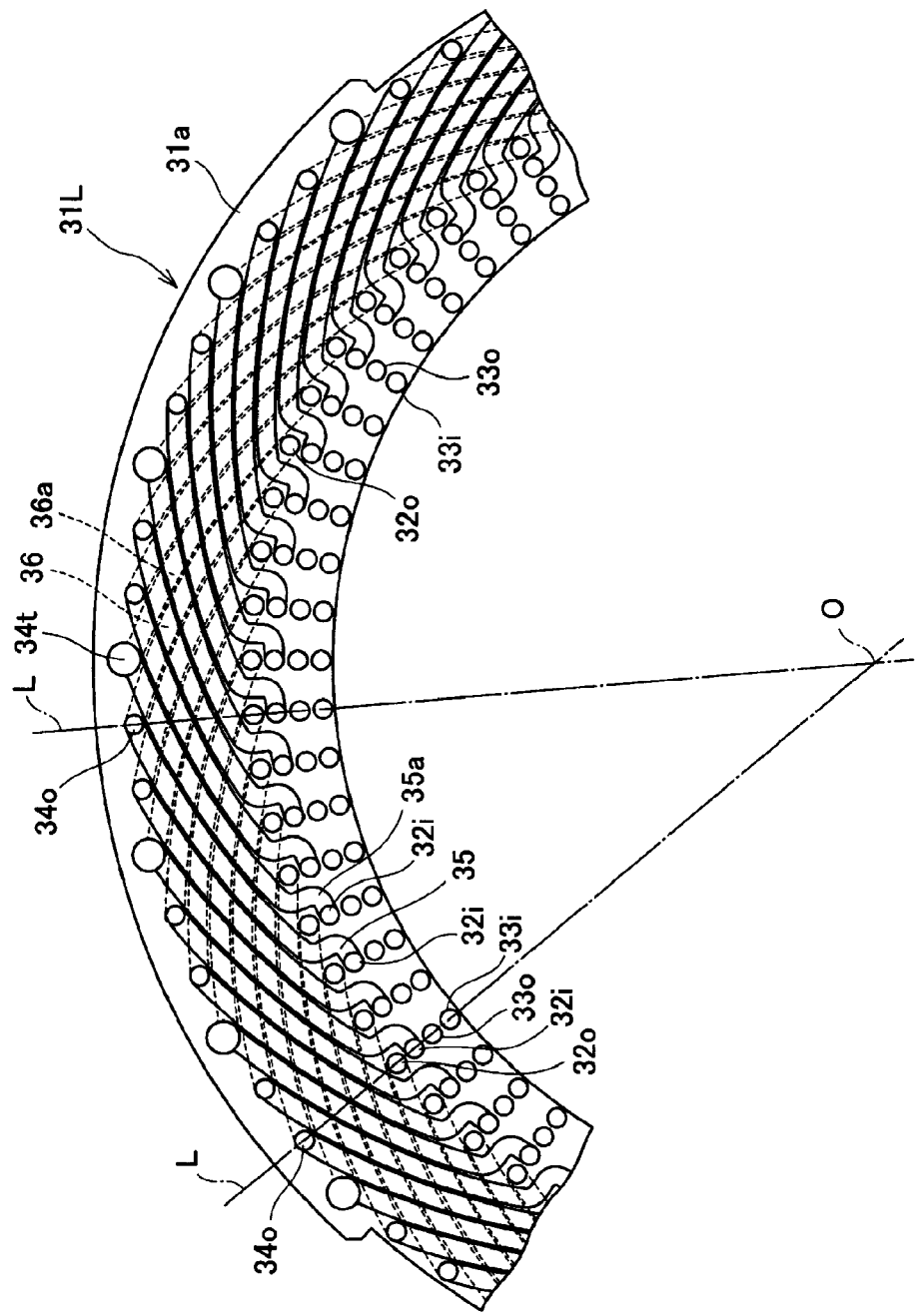
FIG. 7 is a plan view of a first base plate.
Figure 8:
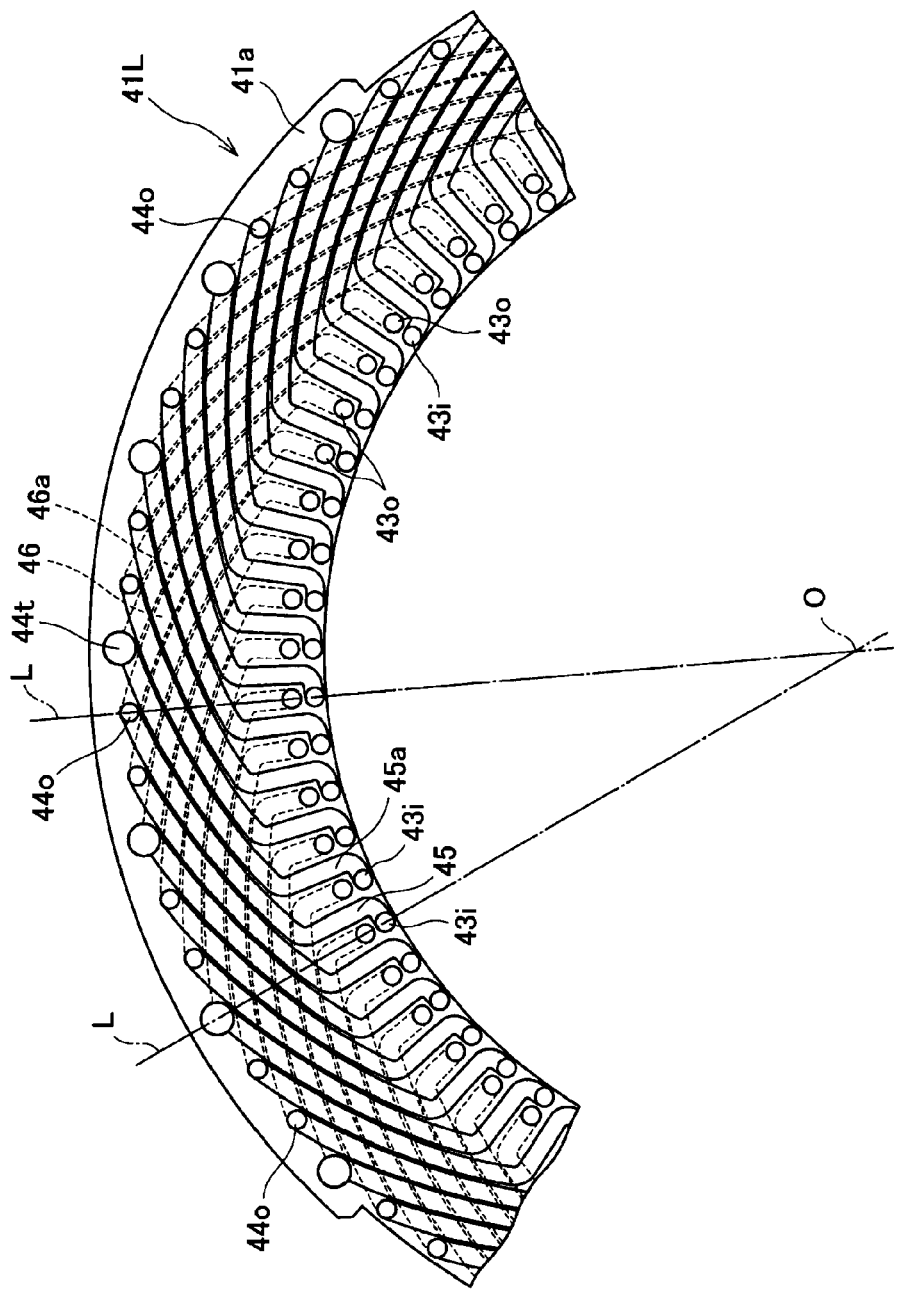
FIG. 8 is a plan view of a second base plate.

As shown in FIGS. 7 and 8, the first and second base plates 31L, 41L are substantially annular members which are formed from a resin having insulating properties (a non-magnetic material) and which have a bore diameter and an outside diameter which are substantially the same as those of the stator core 21. As shown in respective upper half portions of the figures, deployed portions 31a, 41a which extend in a segmental fashion are provided at a radially outer side of the first and second base plates 31L, 41L, respectively. Connecting terminal portions are provided on these deployed portions 31a, 41a for connection to external equipment or bus bars.

In the first base plate 31L, 72 first radially outer through holes 32o and first radially inner through holes 32i and 72 second radially outer through holes 33o and second radially inner through holes 33i are formed on a radially inner side thereof so as to penetrate the first base plate 31L in positions which correspond to the first radially outer coil bars 26o and the first radially inner coil bars 26i of the first coil bars 26 inserted in the slots 23 in the stator core 21 and the second radially outer coil bars 27o and the second radially inner coil bars 27i of the second coil bars 27 also inserted in the slots 23 in the stator core 21.

The first radially outer through holes 32o, the first radially inner through holes 32i, the second radially outer through holes 33o and the second radially inner through holes 33i are located on the same straight lines L which extend radially from a center O of the first base plate 31L. Outer circumferential holes 34o are formed on the straight lines L and on a radially outer side of the first base plate 31L to thereby establish a communication between an outer surface 37 and an inner surface 38 (refer to FIG. 5) of the first base plate 31L. Six connecting terminal joining holes 34t are formed in the circumferential position of the first base plate 31L where the deployed portion 31a is formed in positions which lie further radially outwards than the outer circumferential holes 34o so as to be positioned in the deployed portion 31a.

On the other hand, in the second base plate 41L, 72 second radially outer through holes 43o and second radially inner through holes 43i are formed on a radially inner side thereof so as to penetrate the second base plate 41L in positions which correspond to the second radially outer coil bars 27o and the second radially inner coil bars 27i of the second coil bars 27 which are inserted in the slots 23 in the stator core 21.

The second radially outer through holes 43o and the second radially inner through holes 43i are located on the same straight lines L which extend radially from a center O of the second base plate 41L. Outer circumferential holes 44o are formed on the straight lines L and on a radially outer side of the second base plate 41L to thereby establish a communication between an outer surface 47 and an inner surface 48 (refer to FIG. 5) of the second base plate 41L. Six connecting terminal joining holes 44t are formed in the circumferential position of the second base plate 41L where the deployed portion 41a is formed in positions which lie further radially outwards than the outer circumferential holes 44o so as to be positioned in the deployed portion 41a.

Plural (72) first left side grooves 35, U-shaped in cross-section and opened to the outer surface 37, and plural (72) first right side grooves 36, U-shaped in cross-section and opened to the inner surface 38, are formed in the outer surface 37 and the inner surface 38 of the first base plate 31L, respectively, so as to be close to one another along involute curves in a circumferential direction of the first base plate 31. The first left side grooves 35 which lie adjacent to one another and the first right side grooves 36 which lie adjacent to one another are separated individually by walls 31b which are erected from the first base plate 31L. The first left-hand side groves 35 and the first right side grooves 36 which are opposite to each other in the axial direction are separated from each other by a bulkhead 31c. Thus, the first left side grooves 35 and the first right side grooves 36 are individually electrically insulated (refer to FIG. 5).

Plural (72) second left side grooves 45, U-shaped in cross-section and opened to the outer surface 47, and plural (72) second right side grooves 46, U-shaped in cross-section and opened to the inner surface 48, are formed in the outer surface 47 and the inner surface 48 of the second base plate 41L, respectively, so as to be close to one another along involute curves in a circumferential direction of the second base plate 41L. The second left side grooves 45 which lie adjacent to one another and the second right side grooves 46 which lie adjacent to one another are separated individually by walls 41b which are erected from the second base plate 41L. The second left-hand side groves 45 and the second right side grooves 46 which are opposite to each other in the axial direction are separated from each other by a bulkhead 41c. Thus, the second left side grooves 45 and the second right side grooves 46 are individually electrically insulated (refer to FIG. 5).

The first and second base plates 31L, 41L are each set to an axial width which is substantially equal to a sum of respective depths of the left side groove 35/45 and the right side groove 36/46 which correspond to the thicknesses of the end coil connections 50 (a first left-hand side end coil connection 51 and a first right-hand side end coil connection 52 or a second left-hand side end coil connection 56 and a second right-hand side end coil connection 57, which will be described later) and a thickness of the bulkhead 31c/41c.

The first and second left side grooves 35, 45 of the first and second base plates 31L, 41L are formed curvilinearly along the involute curves, as indicated by solid lines in FIGS. 7 and 8, so as to connect together the first and second radially inner through holes 32i, 43i and the outer circumferential holes 34o, 44o which are formed on the straight lines L which pass through the first radially inner through holes 32i, 43i which are five holes apart in a clockwise direction from the first and second radially inner through holes 32i, 43i.

In the plural first and second left side grooves 35, 45, six first left side grooves 35a and six second left side grooves 45a which extend towards the deployed portions 31a, 41a extend along the involute curves to reach the straight lines L which pass through the first and second radially inner through holes 32i, 43i which are five holes apart in the clockwise direction from the first and second radially inner through holes 32i, 43i and thereafter connect to the connecting terminal joining holes 34t, 44t which are situated slightly further radially outwards than the outer circumferential holes 34o, 44o.

The first left side grooves 35, 35a and the second left side grooves 45, 45a are formed so as to extend radially while bending so as to avoid the first and second radially outer through holes 32o, 43o and thereafter to extend along the involute curves. However, since the radial positions of the first radially inner through hole 32i and the second radially inner through hole 43i are different, portions of the second left side grooves 45, 45a which extend radially are formed longer than those of the first left side grooves 35, 35a.

The first and second right side grooves 36, 46 of the first and second base plates 31L, 41L are formed curvilinearly along the involute curves, as indicated by broken lines in FIGS. 7 and 8, so as to connect together the first and second radially outer through holes 32o, 43o and the outer circumferential holes 34o, 44o which are formed on the straight lines L which pass through the first and second radially outer through holes 32o, 43o which are five holes apart in a counterclockwise direction from the first and second radially outer through holes 32o, 43o.

In the plural first and second right side grooves 36, 46, six first right side grooves 36a and six second right side grooves 46a which extend towards the deployed portions 31a, 41a extend along the involute curves to reach the straight lines L which pass through the first and second radially outer through holes 32o, 43o which are five holes apart in the counterclockwise direction from the first and second radially outer through holes 32o, 42o and thereafter connect to the connecting terminal joining holes 34t, 44t.

Although the first right side grooves 36, 36a are formed curvilinearly so as to extend directly from the first radially outer through holes 32o along the involute curves, the second right side grooves 46, 46a are formed so as to extend radially along the straight lines L which pass through the second radially outer through holes 43o to thereafter bend along the involute curves.

Consequently, as shown in FIGS. 7 and 8, the first and second radially outer through holes 32o, 43o and the first and second radially inner through holes 32i, 43i which are situated 10 holes apart from each other in the clockwise direction (or the counterclockwise direction) continue to each other via the first and second left side grooves 35, 45, the outer circumferential holes 34o, 44o, and the first and second right side grooves 36, 46.

In the base plate assemblies 30R, 40R, respective first and second left side grooves 35, 45 of the first and second base plates 31R, 41R are opened to inner surfaces 38, 48, and respective first and second right side grooves 36, 46 are opened to outer surfaces 37, 47. The first left side grooves 35 of the base plates 31L, 31R have the same shape, and the first right side grooves 36 of the first base plates 31L, 31R also have the same shape. The second left side grooves 45 of the second base plates 41L, 41R have the same shape, and the second right side grooves 46 of the second base plates 41L, 41R also have the same shape.

The end coil connections 50 are each formed of a conductive material such as copper into something like a plate. As shown in FIGS. 5 and 9, in the first base plate assembly 30L, the end coil connections 50 include first left-hand side end coil connections 51, 51a which are inserted in the first left side grooves 35, 35a, respectively, and first right-hand side end coil connections 52, 52a which are inserted in the first right side grooves 36, 36a, respectively. In the second base plate 40L, the end coil connections 50 include second left-hand side end coil connections 56, 56a which are inserted in the second left side grooves 45, 45a, respectively, and second right-hand side end coil connections 57, 57a which are inserted in the second right side grooves 46, 46a, respectively.

Figure 9A:
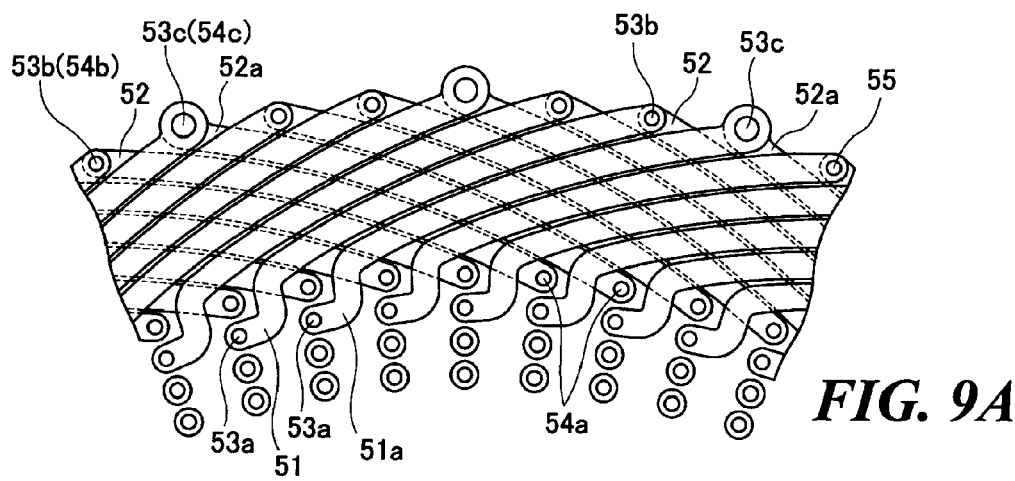
FIG. 9A is a plan view of a main part of a first base plate assembly with the first base plate omitted.

As indicated by solid lines in FIG. 9A, the first left-hand side end coil connections 51 have the same shape as that of the first left side grooves 35, and connecting holes 53a, 53b are formed in both end portions thereof. The first left-hand side end coil connections 51a have the same shape as that of the first left-hand side groves 35a, and a connecting hole 53a and a connecting terminal hole 53c are formed in both end portions thereof.

As indicated by broken lines in FIG. 9A, the first right-hand side end coil connections 52 have the same shape as that of the first right side grooves 36, and connecting holes 54a, 54b are formed in both end portions thereof. The first right-hand side end coil connections 52a have the same shape as that of the first right-hand side groves 36a, and a connecting hole 54a and a connecting terminal hole 54c are formed in both end portions thereof.

Figure 9B:
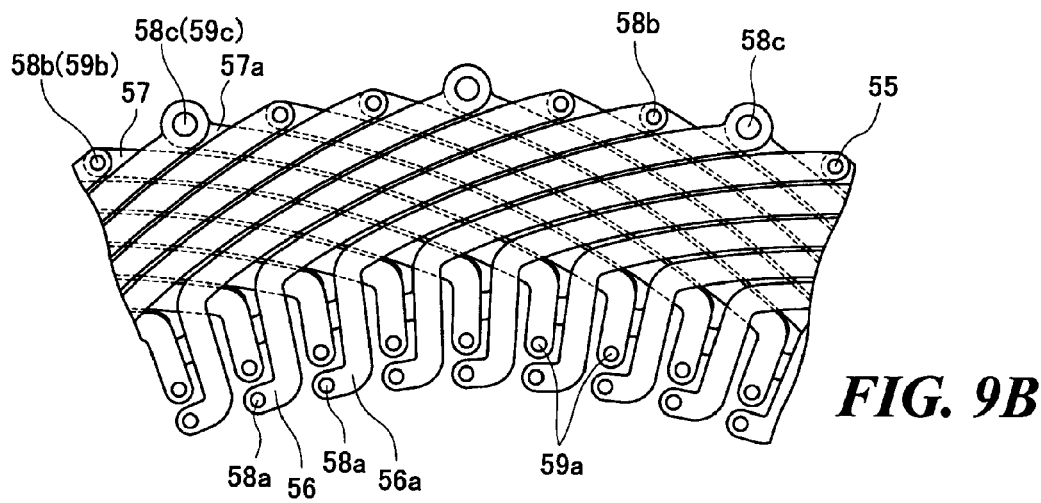
FIG. 9B is a plan view of a main part of a second base plate assembly with the second base plate omitted.

Similarly, as indicated by solid lines in FIG. 9B, the second left-hand side end coil connections 56 have the same shape as that of the second left side grooves 45, and connecting holes 58a, 58b are formed in both end portions thereof. The second left-hand side end coil connections 56a have the same shape as that of the second left-hand side groves 45a, and a connecting hole 58a and a connecting terminal hole 58c are formed in both end portions thereof.

As indicated by broken lines in FIG. 9B, the second right-hand side end coil connections 57 have the same shape as that of the second right side grooves 46, and connecting holes 59a, 59b are formed in both end portions thereof. The second right-hand side end coil connections 57a have the same shape as that of the second right-hand side groves 46a, and a connecting hole 59a and a connecting terminal hole 59c are formed in both end portions thereof These connecting holes 53a, 54a, 58a, 59a have diameters which are substantially equal to the small-diameter portion 26a of the coil bars 26i, 26o, 27i, 27o, respectively, and the connecting holes 53b, 54b, 58b, 59b have diameters which are substantially equal to that of a connecting pin 55.

Then, the first left-hand side end coil connections 51, 51a are inserted in the first left side grooves 35, 35a, respectively, and the first right-hand side end coil connections 52, 52a are inserted in the first right side grooves 36, 36a, respectively. Connecting pins 55 which are each made of a conductive material such as copper, aluminum or the like are inserted into the connecting holes 54b to thereby connect electrically the first left-hand side end coil connections 51 and the first right-hand end coil connections 52 together.

Similarly, the second left-hand side end coil connections 56, 56a are inserted in the second left side grooves 45, 45a, respectively, and the second right-hand side end coil connections 57, 57a are inserted in the second right side grooves 46, 46a, respectively. And, connecting pins 55 are also inserted into the connecting holes 59b to thereby connect electrically the second left-hand side end coil connections 56 and the second right-hand end coil connections 57 together.

Thus, the first base plate assemblies 30L, 30R are formed such that the connecting hole 53a in the first left-hand side end coil connection 51 and the connecting hole 54a in the first right hand-side end coil connection 52 which are situated 10 holes apart from each other in the clockwise (or counterclockwise) direction are electrically connected together via the first left-hand side end coil connection 51, the connecting pin 55 and the first right-hand side end coil connection 52.

The second base plate assemblies 40L, 40R are formed such that the connecting hole 58a in the second left-hand side end coil connection 56 and the connecting hole 59a in the second right hand-side end coil connection 57 which are situated 10 holes apart from each other in the clockwise (or counterclockwise) direction are electrically connected together via the second left-hand side end coil connection 56, the connecting pin 55 and the second right-hand side end coil connection 57.

In the stator core assembly 20, the first base plate assemblies 30L, 30R and the second base plate assemblies 40L, 40R which are assembled individually in the ways described above, as shown in FIGS. 2, 5 and 6, the first base plate assemblies 30L, 30R and the second base plate assemblies 40L, 40R are assembled individually to the axial ends of the stator core assembly 20 so as to be laminated together, whereby the stator 10 is formed.

Thus, when the stator 10 is so formed, as shown in FIGS. 5 and 6, in the first base plate assembly 30L which is disposed at one end face 21a (a left-hand side in the figures) of the stator core 21, the second radially outer coil bar 27o and the second radially inner coil bar 27i are inserted into the second radially outer through hole 33o and the second radially inner through hole 33i (refer to FIG. 7) of the first base plate 31L, respectively, and the small-diameter portion 26a of the first radially outer coil bar 26o is inserted into the connecting hole 54a of the first right-hand side end coil connection 52/52a and the small-diameter portion 26a of the first radially inner coil bar 26i is inserted into the connecting hole 53a of the first left-hand side end coil connection 51/51a. Thereafter, the small-diameter end portions 26a are joined to the corresponding holes through pressing or welding. The connecting hole 53b of the first left-hand side end coil connection 51 and the connecting hole 54b of the first right-hand side end coil connection 52 are joined together by the connecting pin 55. Namely, the first left-hand side end coil connection 51/51a and the first right-hand side end coil connection 52/52a connect the coil bars 26 of the same phase (for example, a U phase) to thereby configure the end coil connections 50 functioning as spanning portions of a coil 60.

Similarly in the base plate assembly 30R which is disposed at the other end face 21b (a right-hand side in the figures) of the stator core 21, the second radially outer coil bar 27o and the second radially inner coil bar 27i are inserted into the second radially outer through hole 33o and the second radially inner through hole 33i of the base plate 31R, respectively, and the small-diameter portion 26a of the first radially outer coil bar 26o is inserted into the connecting hole 54a of the first right-hand side end coil connection 52/52a and the small-diameter portion 26a of the first radially inner coil bar 26i is inserted into the connecting hole 53a of the first left-hand side end coil connection 51. Thereafter, the small-diameter end portions are joined to the corresponding holes. The connecting hole 53b of the first left-hand side end coil connection 51 and the connecting hole 54b of the first right-hand side end coil connection 52 are joined together by the connecting pin 55. Namely, the first left-hand side end coil connection 51 and the first right-hand side end coil connection 52 connect the coil bars 26 of the same phase (for example, a U phase) to thereby configure the end coil connections 50 functioning as spanning portions of the coil 60.

Consequently, with respect to the first coil bar 26 which is disposed in one slot 23, the first right-hand side end coil connection 52 which is connected at the one end 21a (the left-hand side in the figures) of the first radially outer coil bar 26o extends radially outwards and in the counterclockwise direction to be connected to the first left-hand side end coil connection 51 of the same phase, while the first right-hand side end coil connection 52 which is connected at the other end 21b (the right-hand side in the figures) of the first radially outer coil bar 26o extends radially outwards and in the clockwise direction to be connected to the first left-hand side end coil connection 51 of the same phase. The first left-hand side end coil connection 51 which is connected at the one end 21a (the left-hand side in the figures) of the first radially inner coil bar 26i extends radially outwards and in the clockwise direction to be connected to the first right-hand side end coil connection 52 of the same phase, while the first left-hand side end coil connection 51 which is connected at the other end 21b (the right-hand side in the figures) of the first radially inner coil bar 26i extends radially outwards and in the counterclockwise direction to be connected to the first right-hand side end coil connection 52 of the same phase.

As shown in FIGS. 5 and 6, also, in the base plate assembly 40L which is disposed at one end face (a left-hand side in the figures) of the base plate assembly 30L, the small-diameter end portion 27a of the second radially outer coil bar 27o is inserted into the connecting hole 59a of the second right-hand side end coil connection 57/57a and the small-diameter portion 27a of the second radially inner coil bar 27i is inserted into the connecting hole 58a of the second left-hand side end coil connection 56/56a, whereafter the small-diameter end portions are joined to the corresponding holes. The connecting hole 58b of the second left-hand side end coil connection 56 and the connecting hole 59b of the second right-hand side end coil connection 57 are joined together by the connecting pin 55. Namely, the second left-hand side end coil connection 56/56a and the second right-hand side end coil connection 57/57a connect the coil bars 27 of the same phase (for example, a U phase) together to thereby configure the end coil connections 50 functioning as spanning portions of the coil 60.

In the base plate assembly 40R that is disposed at the other end face (a right-hand side in the figures) of the base plate assembly 30R, the small-diameter portion 27a of the second radially outer coil bar 27o is inserted into the connecting hole 59a of the second right-hand side end coil connection 57 and the small-diameter portion 27a of the second radially inner coil bar 27i is inserted into the connecting hole 58a of the second left-hand side end coil connection 56, whereafter the small-diameter portions are joined to the corresponding holes. The connecting hole 58b of the second left-hand side end coil connection 56 and the connecting hole 59b of the second right-hand side end coil connection 57 are joined together by the connecting pin 55. Namely, the second left-hand side end coil connection 56 and the second right-hand side end coil connection 57 connect the coil bar 27 of the same phase (for example, a U phase) to thereby configure the end coil connections 50 functioning as spanning portions of the coil 60.

Consequently, with respect to the second coil bar 27 which is disposed in one slot 23, the second right-hand side end coil connection 57 which is connected at the one end 21a (the left-hand side in the figures) of the second radially outer coil bar 27o extends radially outwards and in the counterclockwise direction to be connected to the second left-hand side end coil connection 56 of the same phase, while the second right-hand side end coil connection 57 which is connected at the other end 21b (the right-hand side in the figures) of the second radially outer coil bar 27o extends radially outwards and in the clockwise direction to be connected to the second left-hand side end coil connection 56 of the same phase. The second left-hand side end coil connection 56 which is connected at the one end 21a (the left-hand side in the figures) of the second radially inner coil bar 27i extends radially outwards and in the clockwise direction to be connected to the second right-hand side end coil connection 57 of the same phase, while the second left-hand side end coil connection 56 which is connected at the other end 21b (the right-hand side in the figures) of the second radially inner coil bar 27i extends radially outwards and in the counterclockwise direction to be connected to the second right-hand side end coil connection 57 of the same phase.

Figure 10:
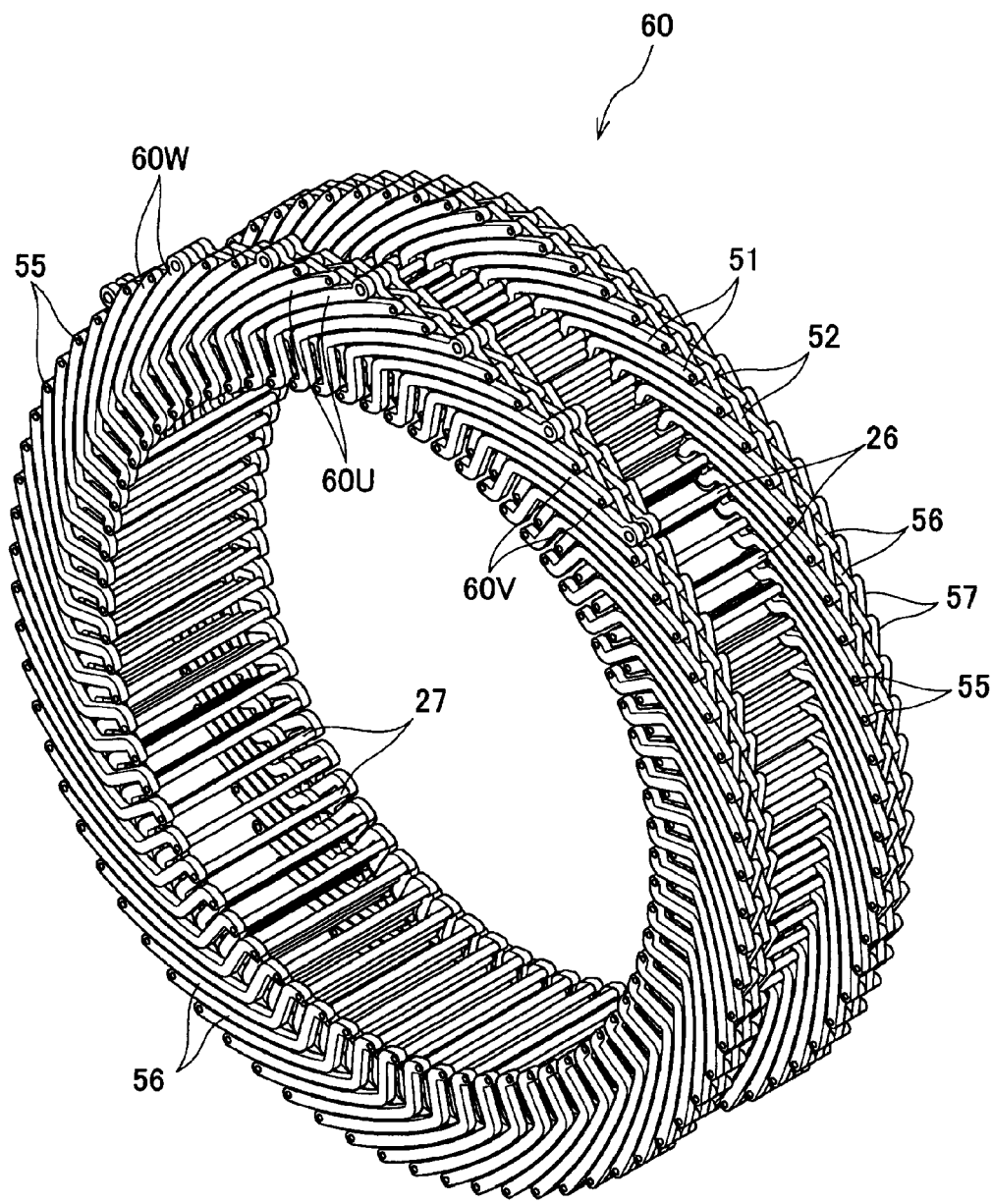
FIG. 10 is a perspective view of a segmented coil of plural phases.

According to this configuration, as shown in FIG. 10, the segmented coil 60 is formed of coil loops of three phases (U-phase coils 60U, V-phase coils 60V, and W-phase coils 60W): eight coil loops each phase. The eight coil loops of one phase are divided into four sets of coil loops: two coil loops each set. Thus, four sets of U-phase coils 60U, four sets of V-phase coils 60V and four sets of W-phase coils 60W are wave wound in the counterclockwise direction in this order (refer to FIGS. 10 and 11). A first radially outer coil bar 26o, a first radially inner coil bar 26i, a second radially outer coil bar 27o and a second radially inner coil bar 27i which are disposed in one slot 23 and which are covered by one insulating material 28 are divided into two coil loops which each form one set of coil loops.

In the above-described stator 10, the first left-hand side end coil connection 51, the first right-hand side end coil connection 52, the second left-hand side end coil connection 56 and the second right-hand side end coil connection 57 are disposed within an area where the stator core 21 is projected axially, excluding the connecting terminal portions thereof and are disposed in the positions which are different in the axial direction.

Next, various connection examples at connecting terminal portions of the coil 60 will be described based on FIGS. 11 to 14. FIGS. 11 to 14 are schematic diagrams which depict U-phase configurations of a single-slot stator to facilitate the understanding of the different configurations shown therein.

Namely, as shown in FIGS. 11 to 14, plural configurations having different connection specifications in which coils are connected in series or in parallel can be made to the coil 60 by changing connections of bus bars as required. Namely, in FIG. 11, four coil loops are connected in series from an IN side to an OUT side in the order of U⇒ (U–)⇒ U⇒ (U–), and in FIG. 12, four coil loops are connected in series from IN to OUT in the order of U⇒ U⇒ (U–)⇒ (U–). U and (U–) denote coil loops of a U-phase which are wound in opposite directions, and in the figures, U is indicated by a solid line, while (U–) by a broken line.

Figure 13:
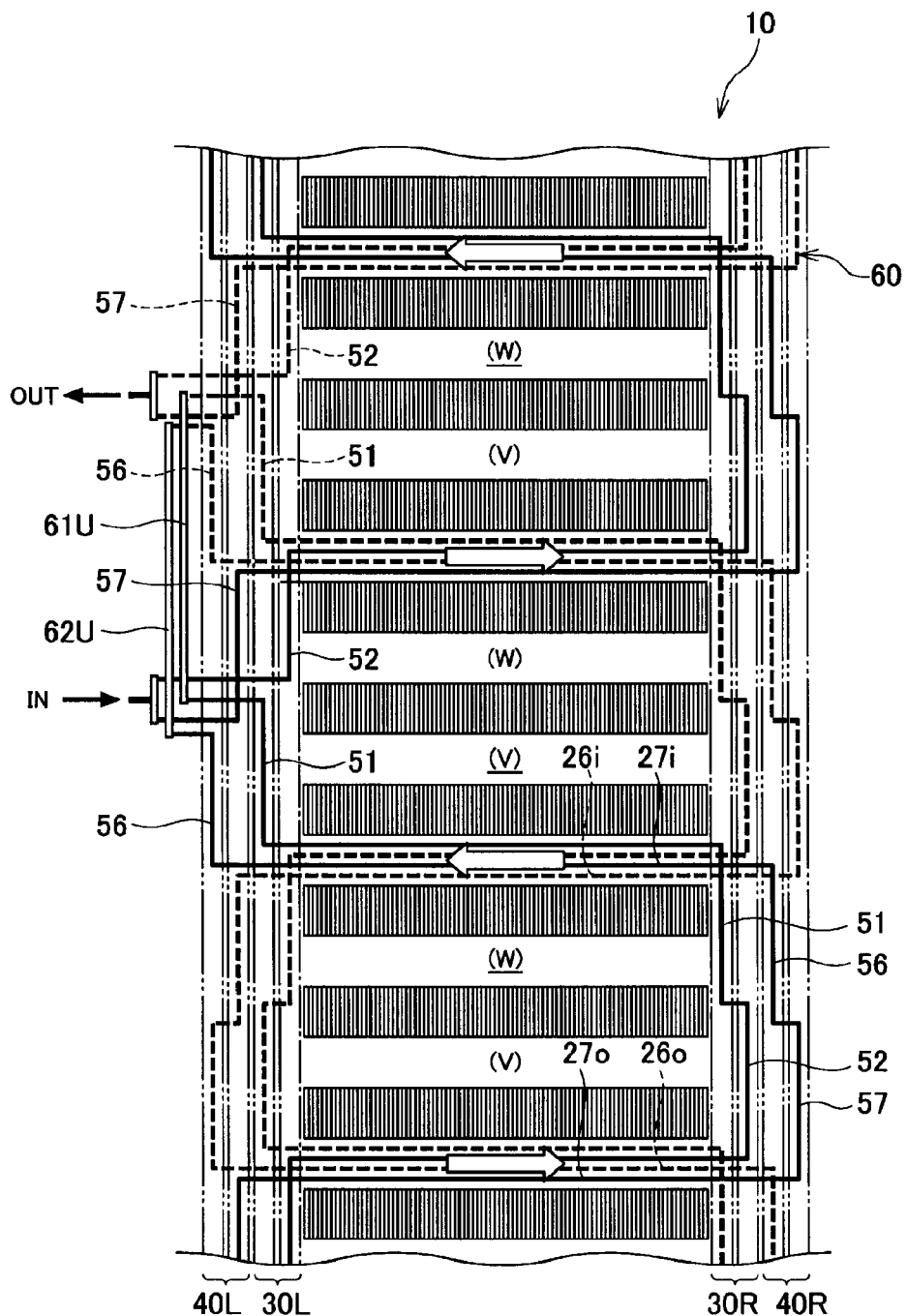
FIG. 13 is a rolled-out view of the stator which shows an example where coils are connected in parallel.
Figure 14:
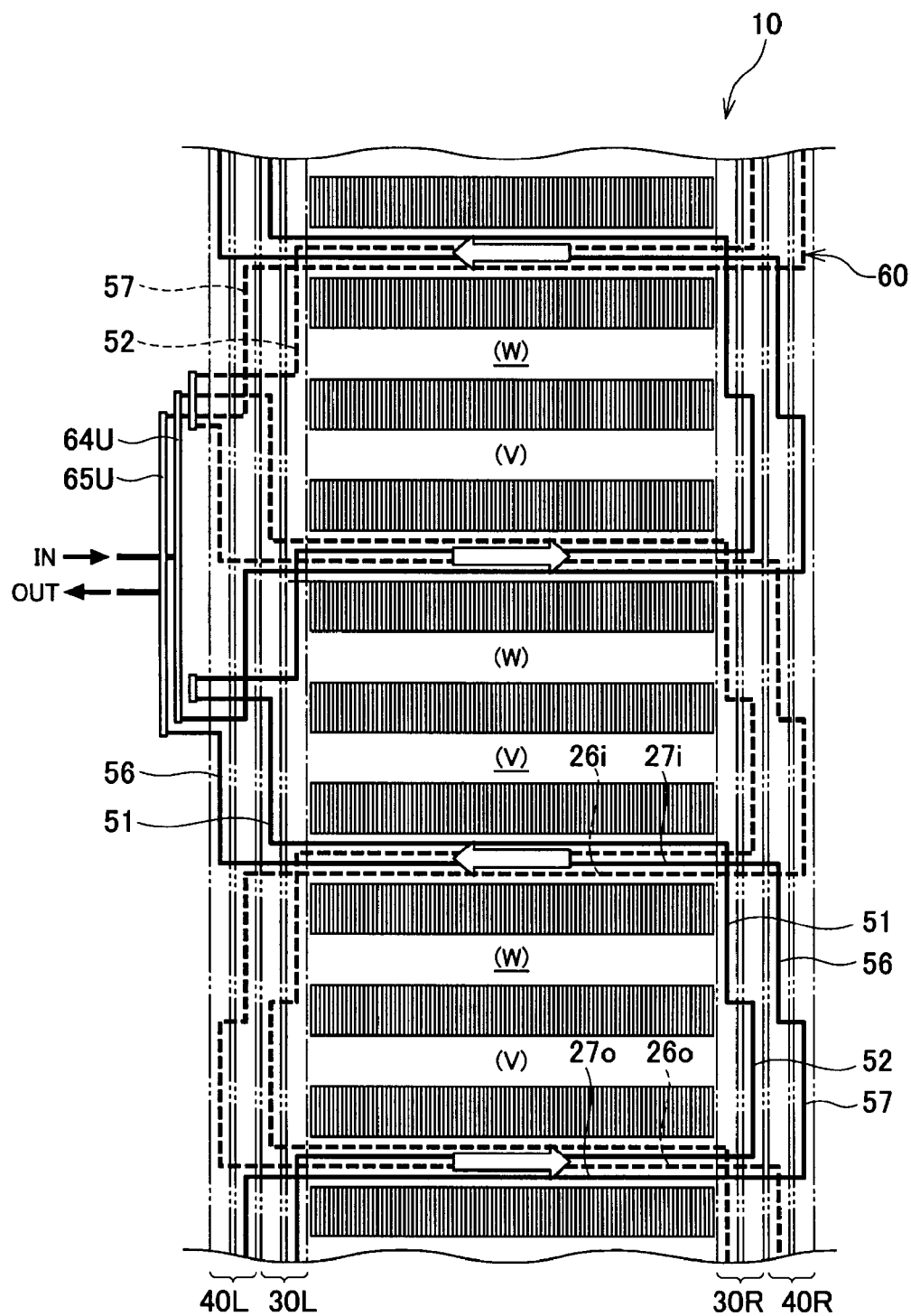
FIG. 14 is a rolled-out view of the stator which shows another example where coils are connected in parallel.

In FIG. 13, two coil loops are connected to each of an IN side and an OUT side, and the four coil loops are connected in parallel in the orders of U⇒ (U–) and U⇒ (U–). In FIG. 14, two coil loops are connected to each of an IN side and an OUT side, and the four coil loops are connected in parallel in the orders of U⇒ (U–) and (U–)⇒ U.

Figure 11:
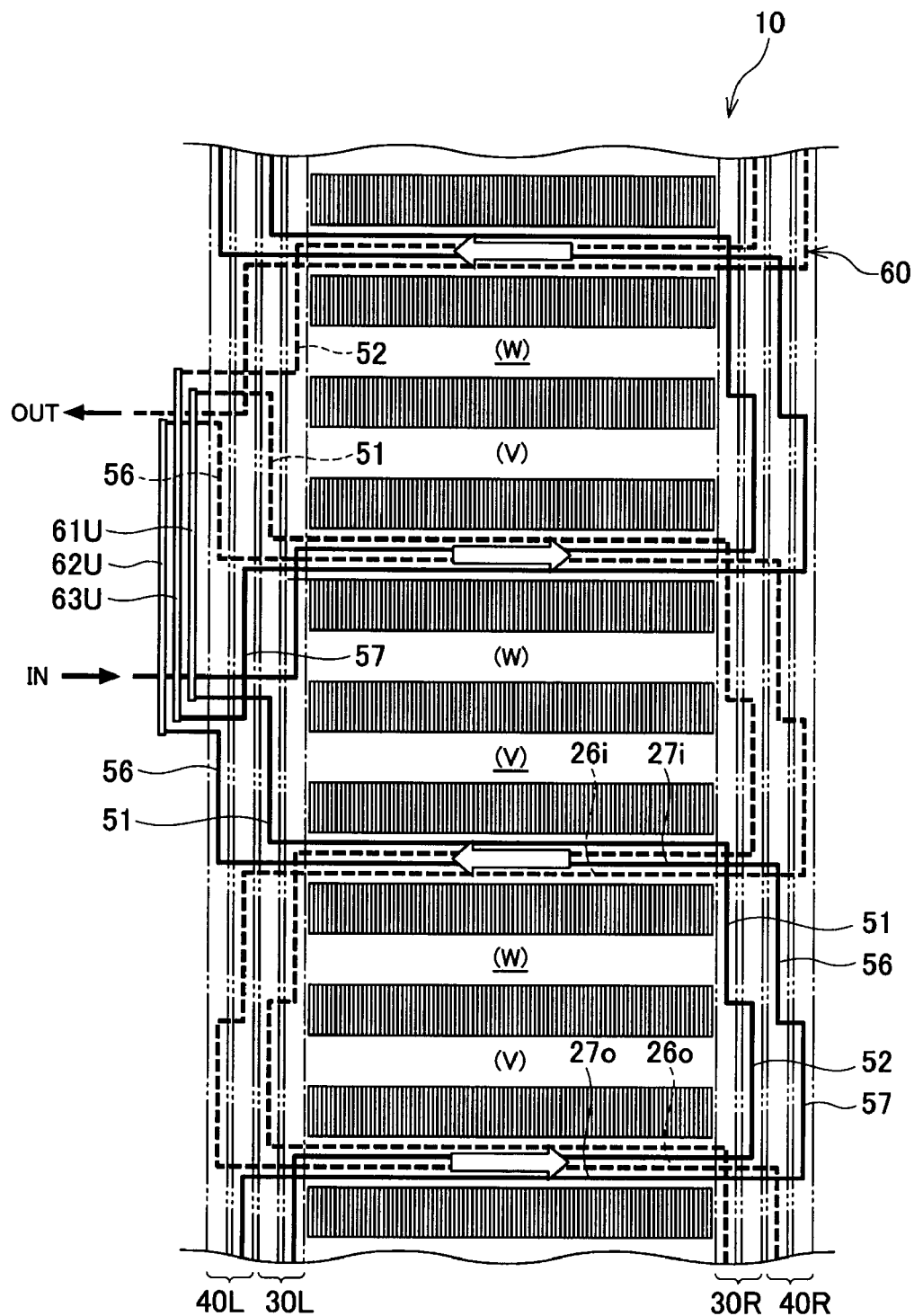
FIG. 11 is a rolled-out view of the stator which shows an example where coils are connected in series.

For example, in the connection example shown in FIG. 11, the first left-hand side end coil connections 51 of the U phase of the first base plate assembly 30L are connected together by a bus bar 61U, and the second left-hand side end coil connections 56 of the U phase of the second base plate assembly 40L are connected together by a bus bar 62U. The first right-hand side end coil connection 52 of the U phase which makes the OUT side of the first base plate assembly 30L and the second right-hand side end coil connection 57 of the U phase which makes the IN side of the second base plate assembly 40L are connected together by a bus bar 63U.

Figure 12:
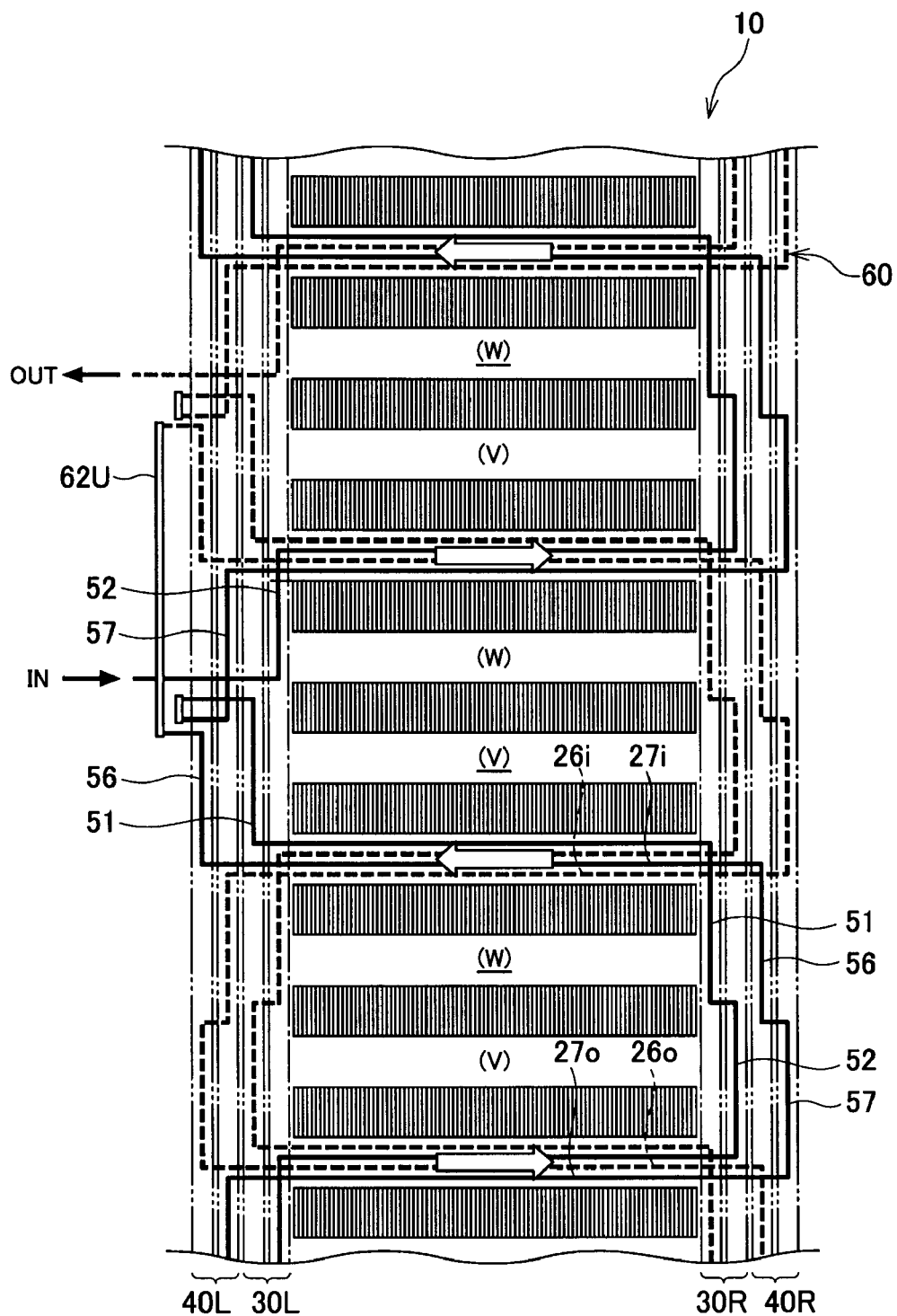
FIG. 12 is a rolled-out view of the stator which shows another example where coils are connected in series.

In the connection example shown in FIG. 12, the second left-hand side end coil connections 56 of the U phase of the second base plate 40L are connected together a bus bar 62, while a middle portion between the first left-hand side end coil connection 51 of the U phase which makes the OUT side of the first base plate 30L and the second right-hand side end coil connection 57 of the U phase which makes the IN side of the second base plate 40L and a middle portion between the second right-hand side end coil connection 57 of the U phase which makes the OUT side of the second base plate 40L and the first left-hand side end coil connection 51 of the U phase which makes the IN side of the first base plate assembly 30L are connected together in the position of the connecting terminal portion.

Here, when comparing the connection example in FIG. 11 with the connection example in FIG. 12, the former connection example requires the three long bus bars 61U, 62U, 63U, whereas the latter connection example requires only the long bus bar 62U. Thus, the connection example shown in FIG. 12 can reduce the number of long bus bars.

In the connection example shown in FIG. 13, the first left-hand side end coil connections 51 of the U phase of the first base plate assembly 30L are connected together by a bus bar 61U, and the second left-hand side end coil connections 56 of the U phase of the second base plate assembly 40L are connected together by a bus bar 62U. The first and second right-hand side end coil connections 52, 57 which make the IN sides of the first and second base plate assemblies 30L, 40L are connected with an IN side external terminal in the position of the connecting terminal portion, and the first and second right-hand end coil connections 52, 57 which make the OUT side are connected with an OUT side external terminal in the position of the connecting terminal portion.

Figure 15:
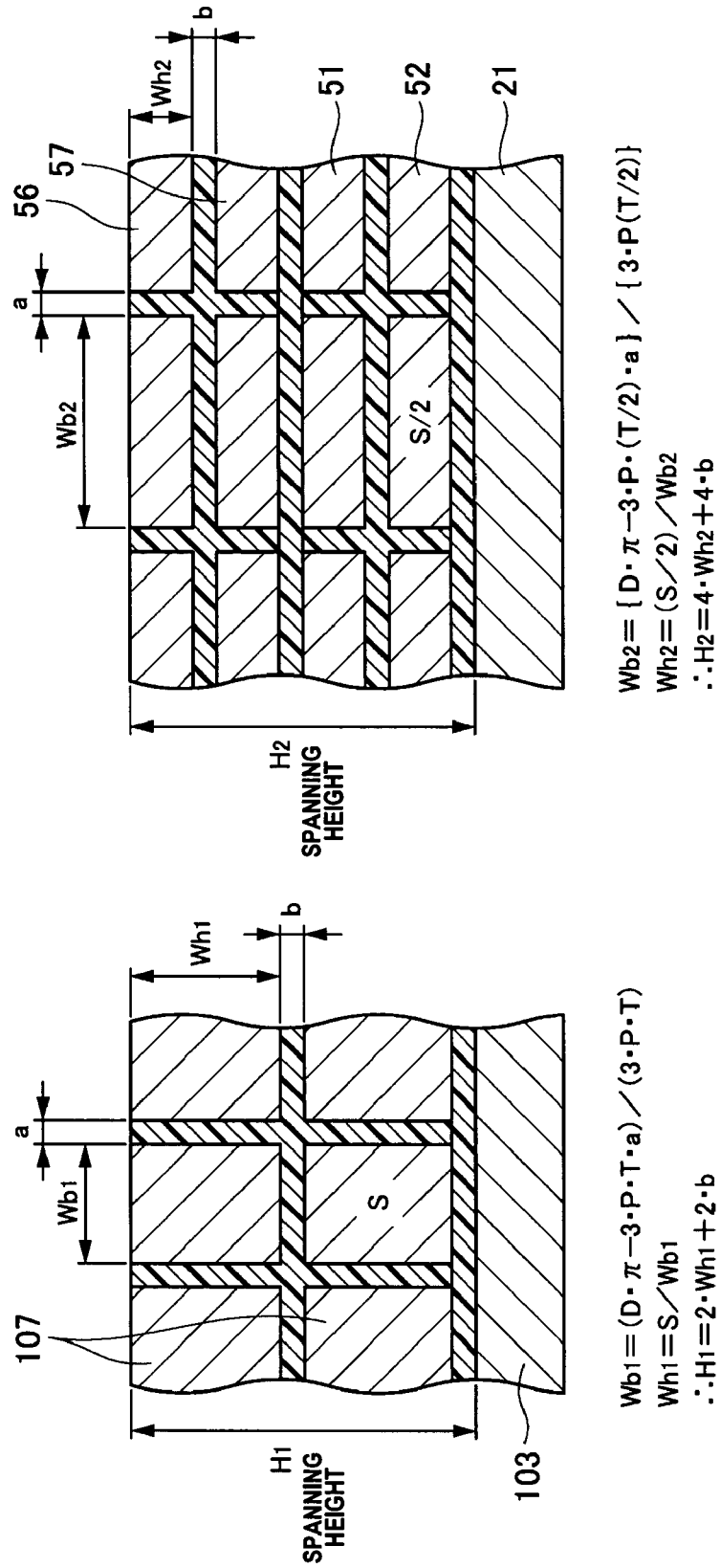
FIG. 15A is a schematic view which depicts a height of a spanning portion of a conventional base plate assembly.
FIG. 15B shows a schematic view which depicts a height of a spanning portion of the base plate assembly.
Figure 22:
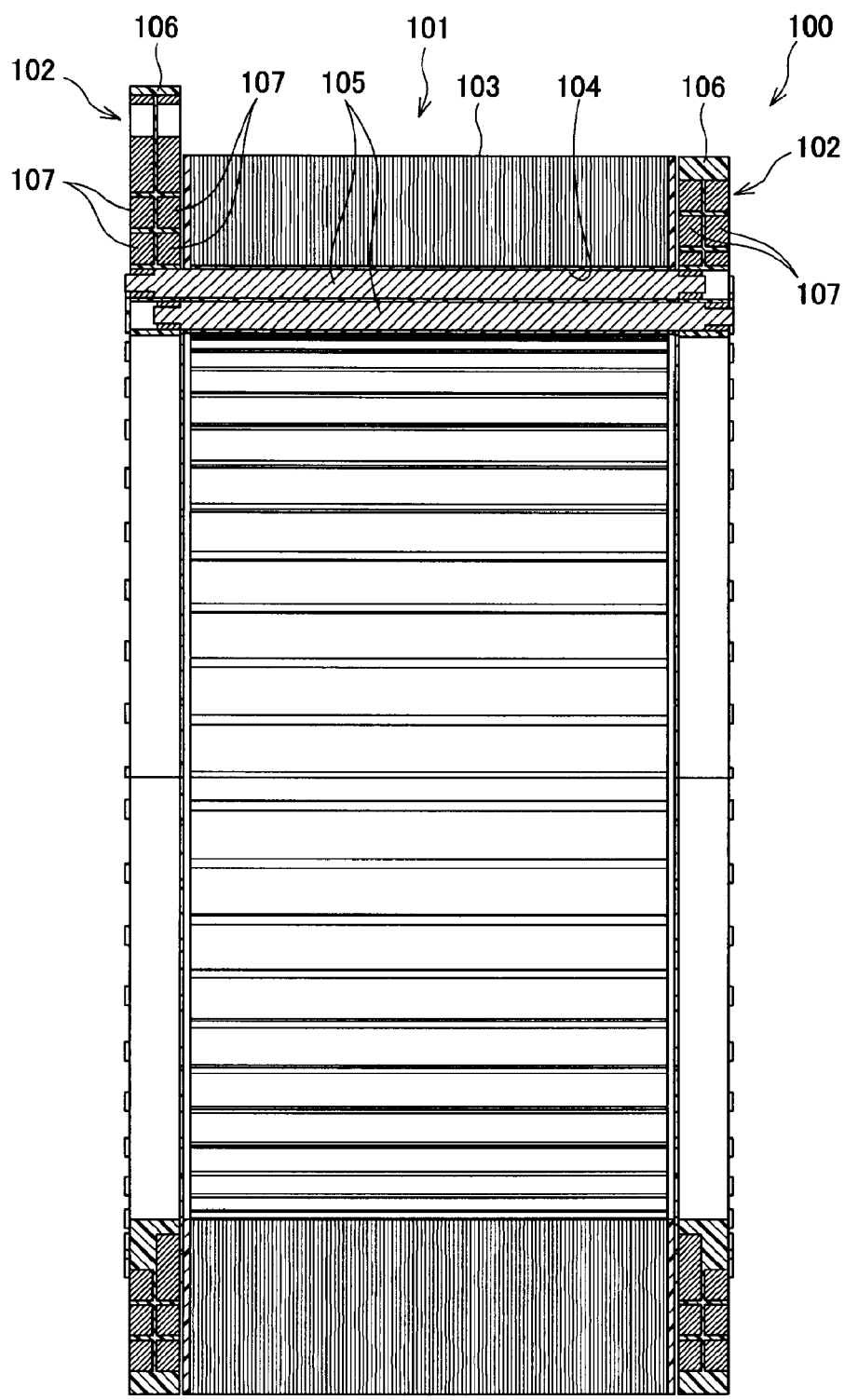
FIG. 22 is a vertical sectional view of a main part of a conventional stator.

In the connection example shown in FIG. 14, the first left-hand side end coil connection 51 of the U phase which makes the OUT side of the first base plate assembly 30L and the first right-hand side end coil connection 52 of the U phase which makes the IN side of the first base plate assembly 30L are connected together in the position of the connecting terminal portion, while the first right-hand side end coil connection 52 of the U phase which makes the OUT side of the first base plate assembly 30L and the second left-hand side end coil connection 52 of the U phase which makes the IN out of the second base plate assembly 40L are connected together in the position of the connecting terminal portion. The first left-hand side end coil connection 51 of the first base plate assembly 30L and the second right-hand side end coil connection of the U phase of the second base plate assembly 40L are connected together by a long bus bar 64U, and the bus bar 64U is connected with an IN side external terminal. The second left-hand side end coil connection 56 of the U phase of the second base plate assembly 40L and the second right-hand side end coil connection 57 of the U phase of the second base plate assembly 40L are connected together by a long bus bar 65U, and the long bus bar 65U is connected to an OUT side external terminal Next, a height of a spanning portion or spanning height of a conventional stator 100 (refer to FIG. 22) and a height of a spanning portion or spanning height of the stator 10 of this embodiment will be considered based on FIG. 15. FIG. 15A is a schematic enlarged view of a main part of the conventional stator 100 as viewed from a bore diameter side thereof, and FIG. 15B is a schematic enlarged view of a main part of the stator 10 of this embodiment as viewed from a bore diameter side thereof. Here, for the purpose of comparison, the number of coil bars remains the same between the conventional stator 100 and the stator 10 of this embodiment. In the conventional stator 100, a predetermined number of turns T is borne by only one set of base plates, whereas a predetermined number of turns T is distributed to two sets of base plates, so that one half of the predetermined number of turns T is borne by one of the two sets of base plates in this embodiment. Consequently, the spanning heights will be considered based on the understanding that a sectional area of an end coil connection of the stator 10 of this embodiment is one half a sectional area S of an end coil connection of the conventional stator 100.

As shown in FIG. 15A, let a circumferential length and an axial width of an end coil connection 107 be Wb1 and Wh1, respectively and a circumferential thickness and an axial thickness of an insulating layer be "a" and "b," respectively, and then, a spanning height H1 of the conventional stator 100 is expressed by (Expression 1). The axial width Wh1 and the circumferential length Wb1 will be expressed by (Expression 2), (Expression 3), respectively. D denotes a typical diameter of a cross-section of a conductor, P the number of pole pairs, S a cross-sectional area of an end coil connection that is connected to one coil bar, and T the number of turns.

$$H1 = 2 \cdot Wh1 + 2 \cdot b \quad \text{[Expression 1]}$$

$$Wh1 = S/Wb1 \quad \text{[Expression 2]}$$

$$Wb1 = (D \cdot \pi - 3 \cdot P \cdot T \cdot a)/(3 \cdot P \cdot T) \quad \text{[Expression 3]}$$

As shown in FIG. 15B, let a circumferential length and an axial width of the end coil connections 51, 52, 56, 57 be Wb2 and Wh2, respectively and a circumferential thickness and an axial thickness of the insulating layer be "a" and "b," respectively, and then, a spanning height H2 of the stator 10 of this embodiment is expressed by (Expression 4). The axial width Wh2 and the circumferential length Wb2 will be expressed by (Expression 5), (Expression 6), respectively.

$$H2 = 4 \cdot Wh2 + 4 \cdot b \quad \text{[Expression 4]}$$

$$Wh2 = (S/2)/Wb2 \quad \text{[Expression 5]}$$

$$Wb2 = (D \cdot \pi - 3 \cdot P \cdot (T/2) \cdot a)/(3 \cdot P \cdot (T/2)) \quad \text{[Expression 6]}$$

As is seen from (Expression 1) and (Expression 4), since $Wh1 \approx Wh1/2$, a difference between the spanning height H1 and the spanning height H2 is only 2b, and it is seen therefrom that there is almost no difference therebetween.

The above comparison is made based on the inner circumferential surface of the coil and hence, the outside diameter is not taken into consideration. Therefore, a comparison will be made by taking the outside diameter into consideration based on FIG. 16, which is a schematic side view of the end coil connection. For a simplified comparison, it is assumed that the end coil connection is a straight end coil connection whose width Wv is constant.

Figure 16:
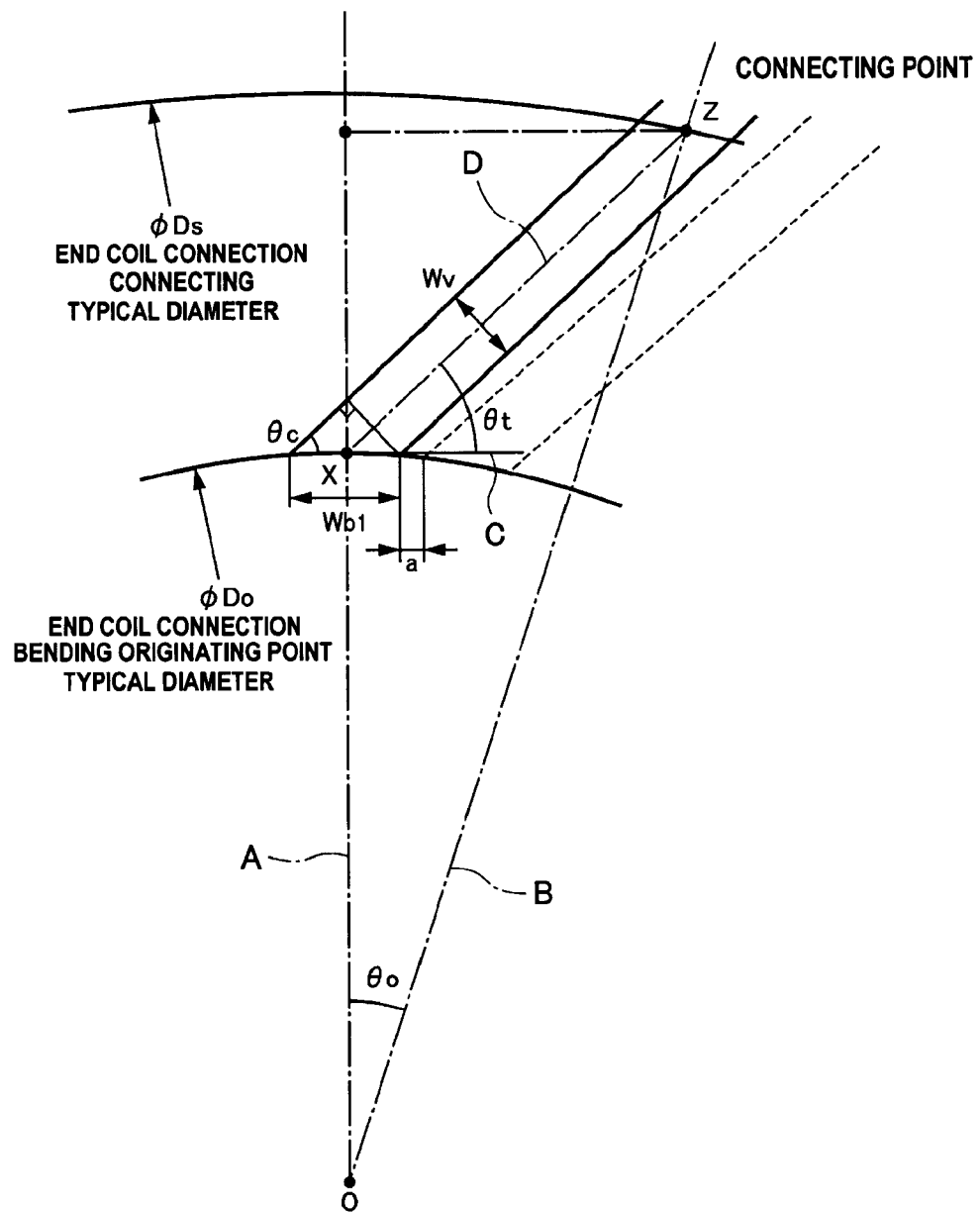
FIG. 16 is a diagram which explains a calculation of a spanning height of an end coil connection.

Let a bore diameter (an initiating point of the involute curve) of the end coil connection be represented by a point x and an outside diameter (a terminating point of the involute curve) of the end coil connection represented by a point z, as shown in FIG. 16, coordinates (Ox, Oy) of a point O are (0, 0), coordinates (Xx, Xy) of the point X are (0, Do/2), and coordinates (Zx, Zy) of the pint Z are (Ds/2·sin θo, Ds/2·cos θo). Here, θo is an angle formed by a line (a reference line) A which connects the point O with the point x and a line B which connects the point O with the point z.

As shown in FIG. 16, an angle θt formed by a line C which passes through the point x and intersects the reference line A at right angles and a line D which connects the point x and the point z is expressed by (Expression 7). Let an angle θc formed by the line C and a side surface of the end coil connection be an angle θc1 in the conventional stator 100, and then, the angle θc1 is expressed by (Expression 8). Let the angle θc be an angle θc2 in the stator 10 of this embodiment, and then, the angle θc2 is expressed by (Expression 9). Wv1 is a width Wv of the end coil connection in the conventional stator 100, and Wv2 is a width of the end coil connection of the stator 10 of this embodiment.

$$\theta t = \tan^{-1}\{(Zy - Xy)/Zx\} \quad \text{[Expression 7]}$$

$$\theta c1 = \sin^{-1}(Wv1/Wb1) \quad \text{[Expression 8]}$$

$$\theta c2 = \sin^{-1}(Wv2/Wb2) \quad \text{[Expression 9]}$$

When the width Wv of the end coil connection is constant, even though the number of coil loops is increased, although it is physically possible to achieve a required configuration by increasing the angle θc of the end coil connection, in order to form the required number of coil loops, (Expression 10) needs to met.

$$\theta c \leq \theta t \quad \text{[Expression 10]}$$

In order to meet Expression 10 above, compared with the stator 10 of this embodiment, the outside diameter needs to be increased largely in the conventional stator 100. On the other hand, when the outside diameter is maintained, in the conventional stator 100, though the width Wv of the end coil connection is made thinner than that of the end coil connection of the stator 10 of this embodiment, the axial width Wh1 needs to be increased for keeping the sectional area S. As a result of this, in this embodiment, although the spanning height H2 is increased by 2b, in effect, the stator 10 of this embodiment is more advantageous than the conventional stator 100 in relation to the specification change in which the number of coil loops is increased.

Thus, according to the stator 10 of this embodiment, the stator core assembly 20 is formed of the stator core 21 and the plural pairs of first and second coil bars 26, 27 which are individually inserted in the slots 23 in the stator core 21, and the first and second base plate assemblies 30, 40 are formed of the first and second base plates 31, 41 and the plural end coil connections 51, 52, 56, 57 which are disposed on the first and second base plates 31, 41 to connect together the first and second coil bars 26, 27 of the same phase. Then, the first and second base plate assemblies 30, 40 are disposed at each end of the stator core assembly 20 so as to be laminated together, whereby the stator 10 is formed. Therefore, the number of turns or pole pairs of the coil 60 can be increased while suppressing the increase in outside diameter of the stator 10 or spanning height H2 of the coil 60, and the stator 10 can easily be built up.

At least the first and second coil bars 26, 27 are inserted in each of the slots 23 in the stator core 21 so as to be aligned with each other in the radial direction, and the first and second coil bars 26, 27 are connected by the end coil connections 51, 52, 56, 57 of the first and second base plate assemblies 30, 40 which are different. Therefore, the increase in spanning height H2 can be suppressed while increasing the number of windings in the same slot 23.

The first coil bar 26 which is inserted radially outwards in the slot 23 is connected to the first base plate assembly 30 which is disposed at the axially inner side of the stator 10, while the second coil bar 27 which is inserted radially inwards in the slot 23 is connected to the second base plate assembly 40 which is disposed at the axially outer side of the stator 10. Therefore, the second coil bar 27 and the second base plate assembly 40 can easily be assembled to the stator 10 without being interrupted by the first coil bar 26 and the first base plate 30.

Since the second coil bar 27 is longer axially than the first coil bar 26, the second coil bar 27 projects from the first base plate assembly 30. Therefore, the second coil bar 27 can easily be assembled to the second base plate assembly 40 after the first coil bar 26 is connected to the first base plate 30.

Since the insulating sheet element 66 is provided between the first base plate assembly 30 and the second base plate assembly 40, the first base plate assembly 30 and the second base plate assembly 40 can be locked together by the insulating sheet element 66, and the end coil connections 51 52 of the first base plate assembly 30 and the end coil connections 56, 57 of the second base plate assembly 40 can electrically be isolated from each other by the insulating sheet element 66.

The stator 10 can be formed through the steps of inserting individually the first and second coil bars 26, 27 in the slots 23 in the stator core 21 to form the stator core assembly 20, disposing the plural end coil connections 51, 52, 56, 57 on the first and second base plates 31, 41 to form the first and second base plate assemblies 30, 40, and assembling the first and second base plate assemblies 30, 40 at the axial ends of the stator core assembly 20 so as to be laminated together. Therefore, the stator 10 can be formed without increasing the outside diameter of the stator 10 or the spanning height H2 of the coil 60 even though the number of turns or pole pairs of the coil 60 is increased.

Second Embodiment

Next, a stator of an electric rotary machine according to a second embodiment will be described by reference to FIGS. 17 to 21. Like reference numerals will be given to like or similar portions to those of the stator 10 of the first embodiment, and the description thereof will be simplified or omitted.

In the stator 10 of the first embodiment, the outside diameters of the first and second base plate assemblies 30, 40 are set to the diameters which are the same as the outside diameter of the stator core 21. Namely, the end coil connections 51 52 of the first base plate assembly 30 are connected to the first coil bar 26 which is disposed at the radially outer side of the stator core 21, while the end coil connections 56, 57 of the second base plate assembly 40 are connected to the second coil bar 27 which is disposed at the radially inner side of the stator core 21. Because of this, the end coil connections 56, 57 are longer than the end coil connections 51, 52 of the first base plate assembly 30 by the length of the portion which extends radially.

Figure 17:
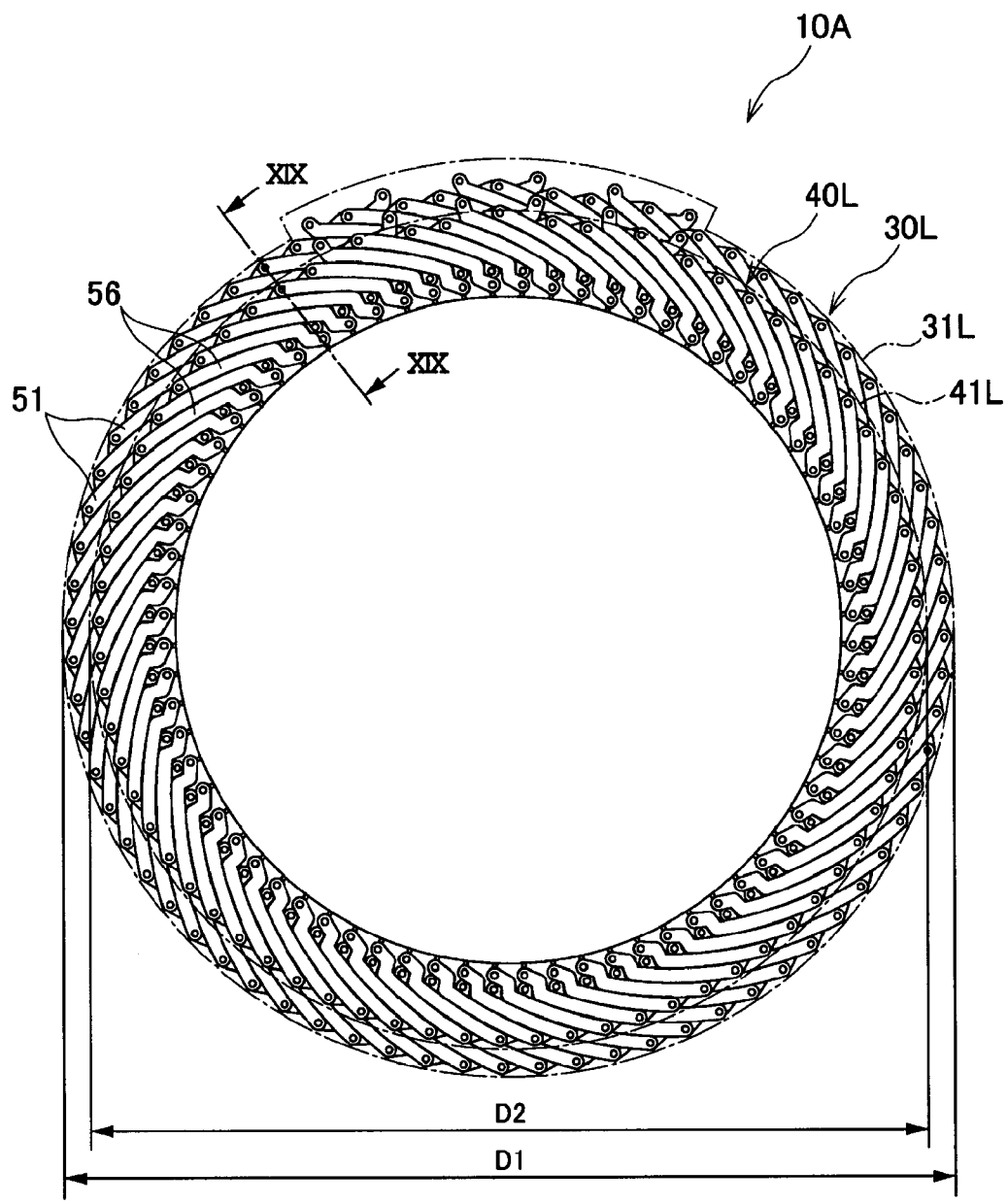
FIG. 17 is a side view of a stator of a second embodiment with base plates omitted.
Figure 18:
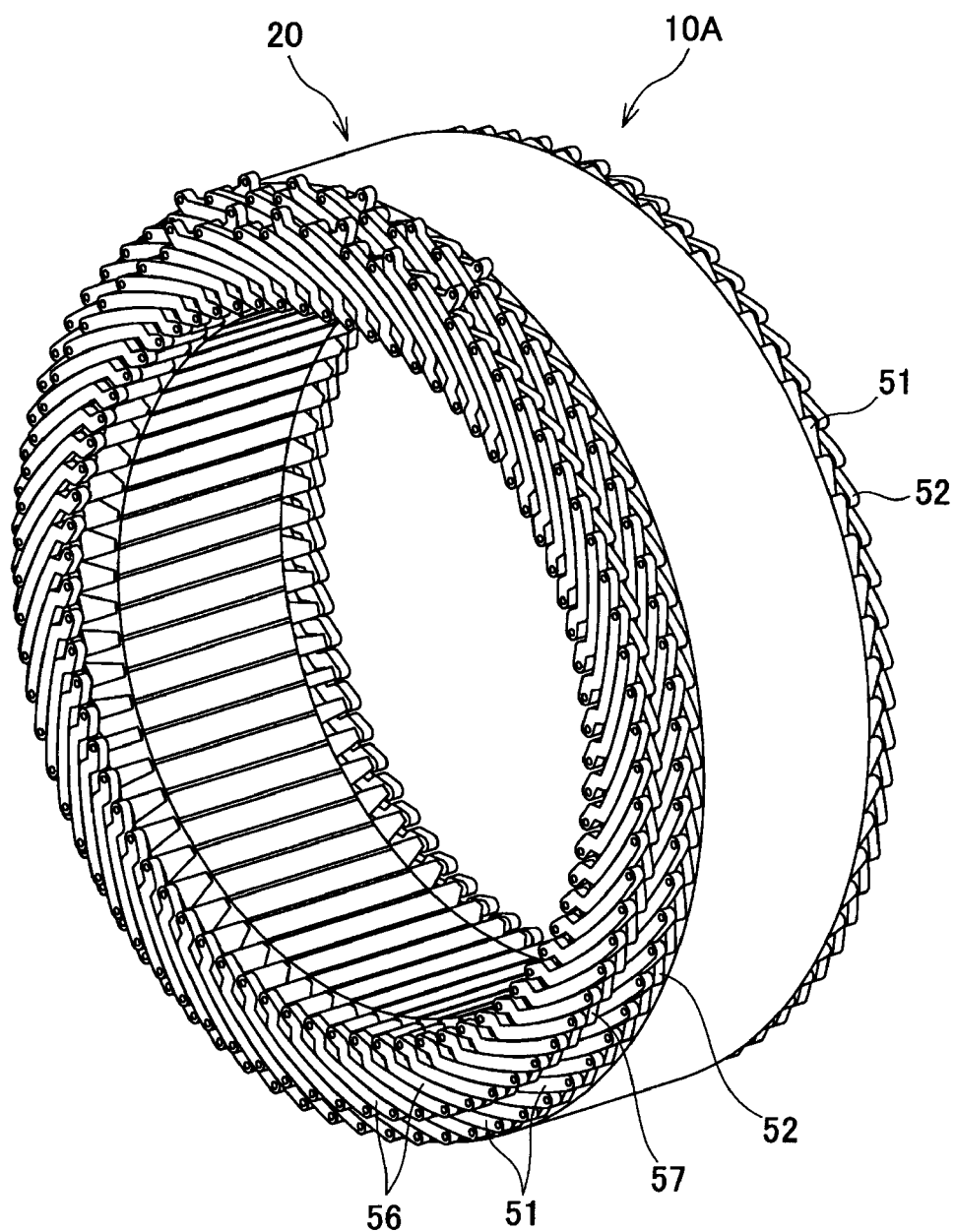
FIG. 18 is a perspective view of the stator shown in FIG. 17 with the base plates omitted.
Figure 19:
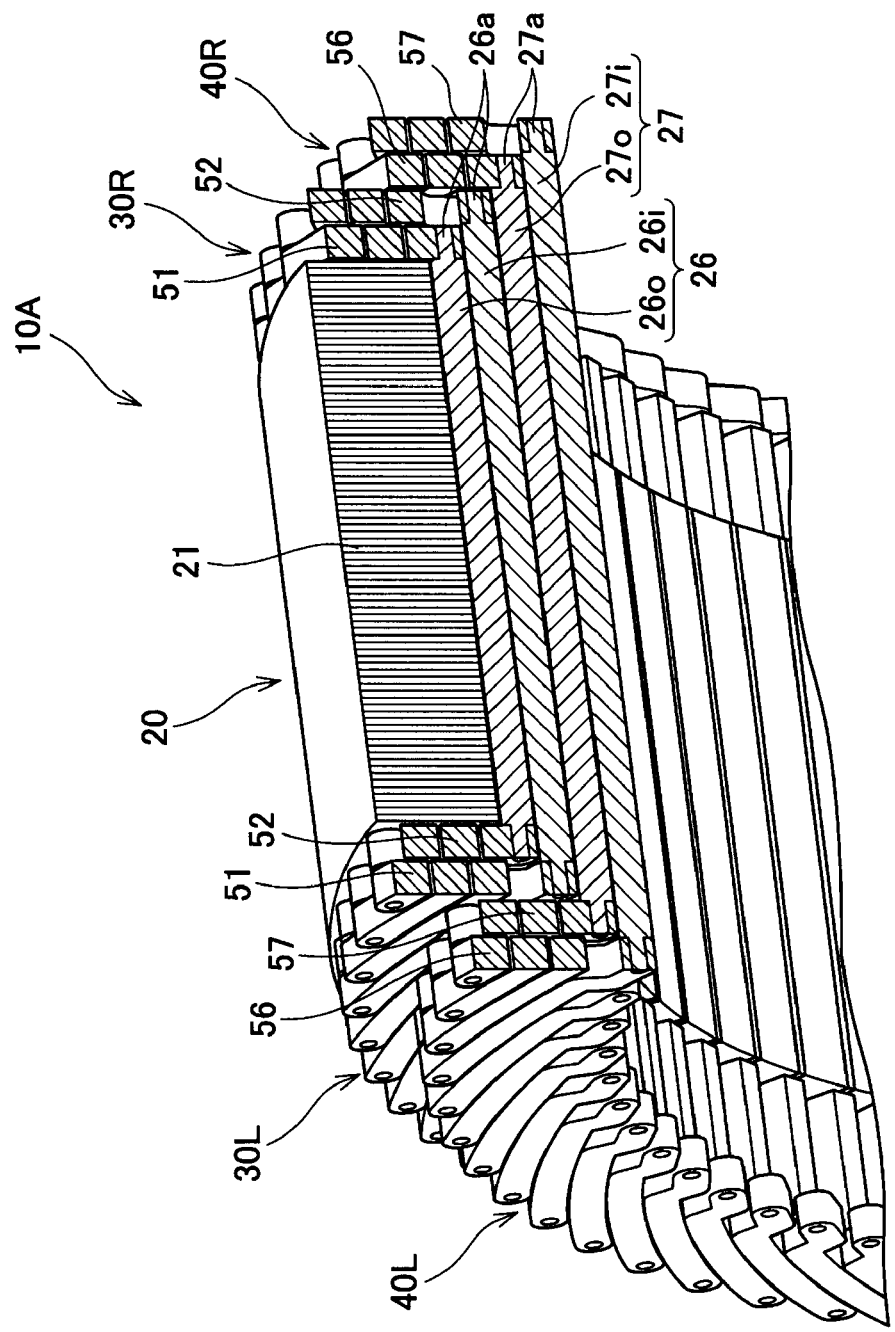
FIG. 19 is a perspective view of part of the stator shown in FIG. 17 which is taken along the line XIX-XIX therein.
Figure 20:
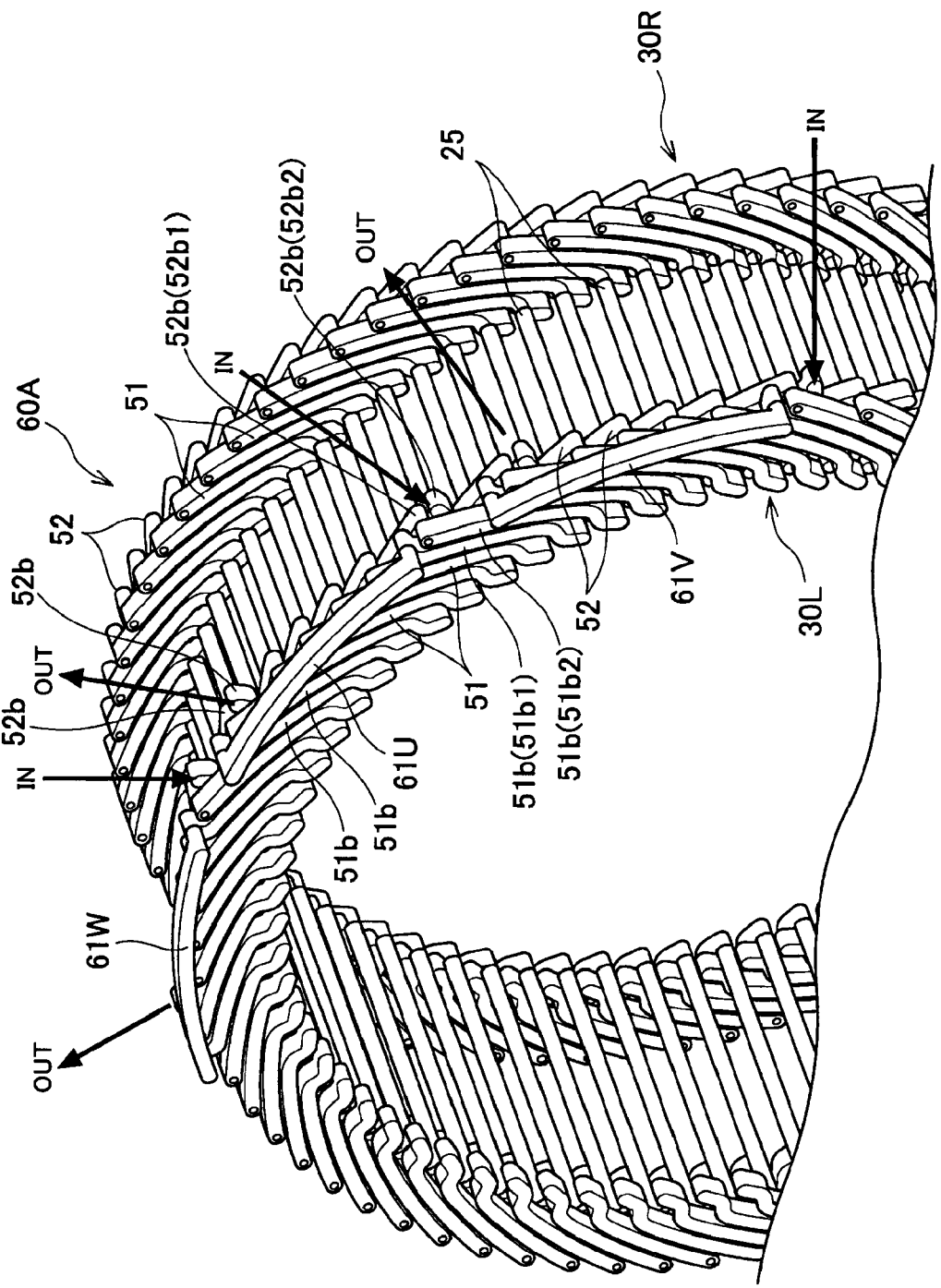
FIG. 20 is a perspective view of a main part of the stator shown in FIG. 17 which shows part of coils thereof.
Figure 21:
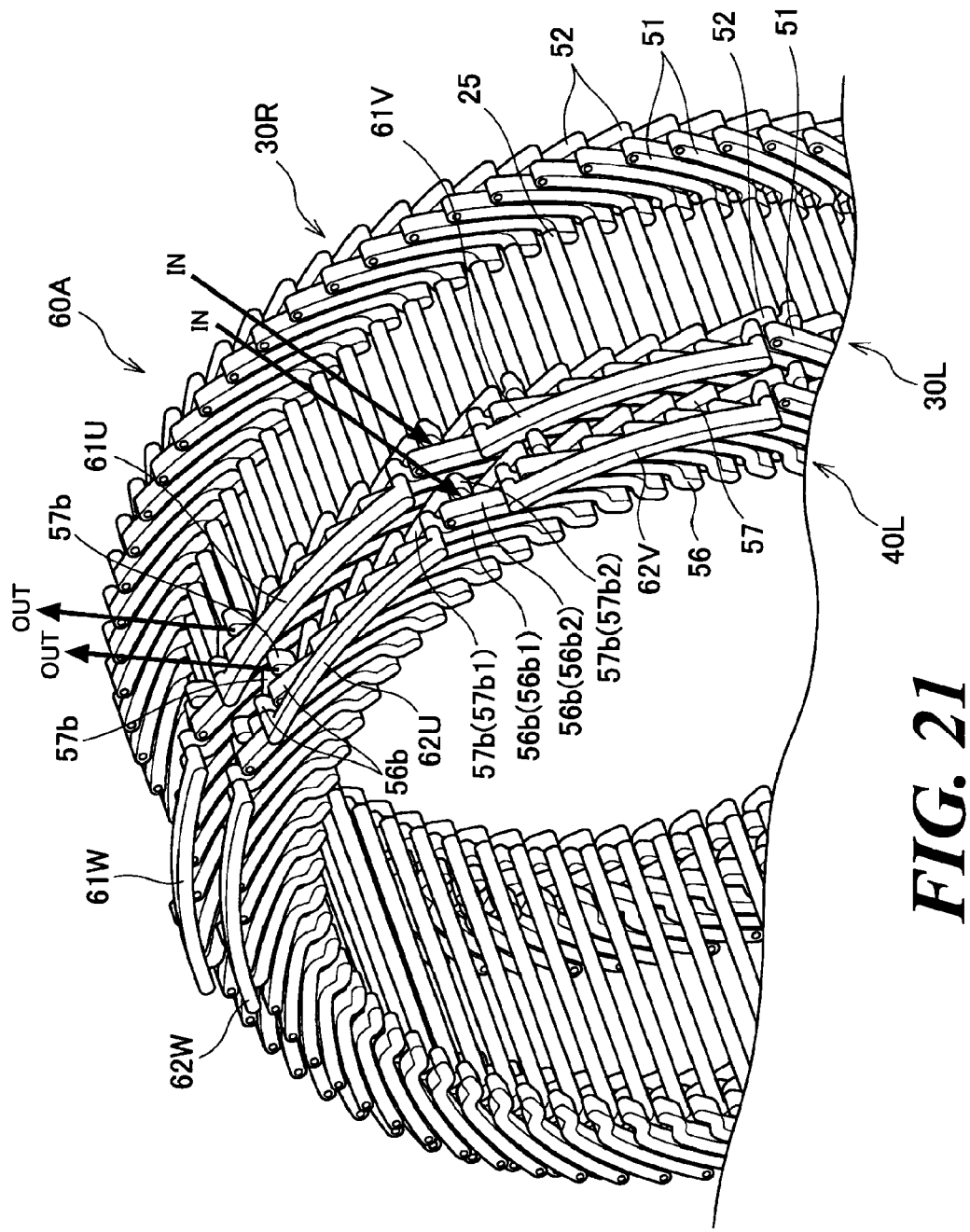
FIG. 21 is a perspective view of a main part of the stator shown in FIG. 17 which shows coils thereof

On the other hand, in a stator 10A of the second embodiment, as shown in FIGS. 17 to 19, an outside diameter D2 of second base plate assemblies 40L, 40R is set smaller than an outside diameter D1 of first base plate assemblies 30L, 30R. Namely, a length of end coil connections 56, 57 which are assembled to second base plates 41L, 41R of the second base plate assemblies 40L, 40R is set to a length which is substantially the same as a length of end coil connections 51, 52 of the first base plate assembly 30, whereby the outside diameter D2 of the second base plate assembly 40 is reduced. Due to this, the stator 10A is made smaller in volume and lighter in weight, thereby enhancing further the installation properties of the stator 10A.

In the stator 10A of this embodiment, the configuration of the first and second base plate assemblies 30, 40 at a connecting terminal portion differs from that of the first embodiment. End coil connections of a U phase will be described by reference to FIGS. 20 and 21 which show a coil 60A with base plates and a stator core thereof omitted.

Namely, in a stator 10A of double-slot type, two end coil connections 51b, 52b, 56b, 57b of a U phase which lie adjacent to each other at a connecting terminal portion are formed longer at a portion thereof which extends along an involute curve than end coil connections 51 52, 56, 57 of a U phase at other portions. At the other portions, in two adjacent left-hand side end coil connections 51, 56 and two adjacent right-hand side end coil connections 52, 57, the left-hand side end coil connections 51, 56 and the right-hand side end coil connections 52, 57 which constitute one side are connected together by a connecting pin 55, and the left-hand side end coil connections 51, 56 and the right-hand side end coil connections 52, 57 which constitute the other side are connected by a connecting pin 55 in a circumferential direction. On the other hand, in two left-hand side end coil connections 51b, 56b and two right-hand side end coil connections 52b, 57b which lie adjacent to each other at the connecting terminal portion, the left-hand side end coil connections 51b2, 56b2 which constitute one side and the right-hand side end coil connections 52b1, 57b1 which constitute the other side are connected by a connecting pin 55 in the circumferential direction. The left-hand side end coil connections 51b1, 56b1 which constitute the other side and the right-hand side end coil connections 52b2, 57b2 which constitute one end extend radially outwards while bending, and connecting terminal holes 53c, 54, 58c, 59c (omitted in FIGS. 20, 21) are formed. The left-hand side end coil connections 51b1, 561b on the other side which are U and (U−) are connected together by bus bars 61U, 62U. When connecting end coil connections in series, of a first base plate assembly 30L and a second base plate assembly 40L, right-hand side end coil connections 52, 57 at an IN side of one base plate assembly 30L, 40L should be connected to right-hand side end coil connections 52, 57 at an OUT side of the other base plate assembly 30L, 40L. When connecting end coil connections in parallel, the right-hand side end coil connections 52, 57 at the IN side of the first base plate assembly 30L and the second base plate assembly 40L should be connected together, and the right-hand side end coil connections 52, 57 at the OUT side of the first base plate assembly 30L and the second base plate assembly 40L should be connected together.

End coil connections of a V phase and a W phase are connected in a similar fashion. Side grooves 35, 36, 45, 46 formed on side surfaces of the base plate assemblies 30L, 40L have the same shapes as those of the end coil connections 51, 52, 56, 57, respectively, so as to match them with the shapes of the end coil connections 51, 52, 56, 57 described above.

In this way, by connecting the end coil connections 51b, 52b, 56b, 57b at the connecting terminal portion of the end coil connections of each phase in the way described above, the end coil connections can be connected together by the bus bars 61U, 62U, 61V, 62V, 61W, 62W which have the simple shape described above. In particular, in this embodiment, the required connection can be effected by making use of the space available at the radially outer side of the second base plate 41L, whereby the enlargement of the stator 10 in size can be suppressed to a smallest level.

The invention is not limited to the above-described embodiments and hence can be modified or improved as required.

For example, in the embodiments, the first and second coil bars which are connected to the end coil connections of the different base plate assemblies are inserted in each of the slots in the stator core so as to be aligned with each other in the radial direction. However, the first and second coil bars may be inserted individually in different slots. Specifically, a first radially outer coil bar and a first radially inner coil bar of the first coil bar and a second radially outer coil bar and a second radially inner coil bar of the second coil bar may be inserted in different slots. Alternatively, the first radially outer coil bar of the first coil bar and the second radially outer coil bar of the second coil bar and the first radially inner coil bar of the first coil bar and the second radially inner coil bar of the second coil bar may be inserted in different slots. Namely, the stator of the embodiment can also be applied to the configuration in which the coil bars of the different phases are disposed in each slot of the stator core. As this occurs, a configuration may be adopted in which end coil connections of a U phase, end coil connections of a V phase and end coil connections of a W phase are disposed in a first base plate assembly, a second base plate assembly and a third base plate assembly, respectively.

The stator 10 of the embodiment is not limited to the stator of double-slot type and hence can also be applied to a stator of single-slot type or a stator of triple-slot type, and even in this event, the same advantage is provided.

The invention claimed is:
1. A stator of an electric rotary machine, including:
a stator core having plural slots;
a segmented coil of plural phases; and
plural base plates laminated at each end of the stator core in an axial direction extending along a rotation axis of the rotary machine, wherein the segmented coil includes
   plural coil bars which are individually inserted in the plural slots in the stator core and which extend substantially straight and
   plural end coil connections which are disposed on each of the base plates to form spanning portions to connect the coil bars of the same phase together,
wherein each of the plural base plates includes plural through holes configured to receive the plural coil bars, respectively,
wherein each of the plural base plates includes an inner surface located on an inner side thereof in the axial direction and an outer surface located on an outer side thereof in the axial direction, the plural end coil connections are disposed on the inner surface and on the outer surface,
wherein the stator core and the plural coil bars form a stator core assembly,
wherein each of the plural base plates is assembled with a corresponding part of the plural end coil connections to form a corresponding one of plural base plate assemblies,
wherein the stator is configured by the stator core assembly and the plural base plate assemblies laminated at each end of the stator core assembly, and
wherein the plural base plates include a first base plate and a second base plate both of which are disposed at one end of the stator core in the axial direction, the second base plate being disposed outward of the first base plate in the axial direction of the stator core.

2. The stator of claim 1,
wherein at least a first and second coil bars are inserted in each of the slots in the stator core so as to be aligned radially with each other, and
wherein the first and second coil bars are connected individually to the end coil connections of the different base plate assemblies.

3. The stator of claim 1,
wherein the coil bars which are inserted in each of the slots in the stator core include
   a first coil bar which is inserted radially outwards and a second coil bar which is inserted radially inwards,
wherein the first coil bar is connected to the end coil connection on a first base plate assembly which includes the first base plate and is disposed axially outwards of the stator core assembly, and
wherein the second coil bar is connected to the end coil connection on a second base plate assembly which includes the second base plate and is disposed axially outwards of the first base plate assembly.

4. The stator of claim 3,
wherein the second coil bar has an axial length which is longer than an axial length of the first coil bar.

5. The stator of claim 3,
wherein an outside diameter of the second base plate assembly is smaller than an outside diameter of the first base plate assembly.

6. The stator of claim 3,
wherein an insulating member is interposed between the first base plate assembly and the second base plate assembly, the insulating member locking the first base plate assembly and the second base plate assembly together and electrically insulating the end coil connections on the first base plate assembly and the end coil connections on the second base plate assembly from each other.

7. A fabrication method for a stator of an electric rotary machine including: a stator core having plural slots; a segmented coil of plural phases; and plural base plates laminated at each end of the stator core in an axial direction, wherein the segmented coil includes plural coil bars which are individually inserted in the plural slots in the stator core and which extend substantially straight and plural end coil connections which are disposed on each of the base plates to form spanning portions to connect the coil bars of the same phase together, the method including:
   inserting the plural coil bars in the individual slots in the stator core to form a stator assembly;
   disposing the plural end coil connections individually in the base plates to form plural base plate assemblies such that each of the plural base plates is assembled with a corresponding part of the plural end coil connections to form a corresponding one of the plural base plate assemblies; and
   laminating the plural base plate assemblies to each end of the stator core assembly in an axial direction extending along a rotation axis of the rotary machine side of the stator core assembly while interposing an insulating member therebetween to assemble them such that the plural base plates include a first base plate and a second base plate both of which are disposed at one end of the stator core assembly in the axial direction, the second base plate being disposed outward of the first base plate in the axial direction of the stator core assembly such that each of the plural base plates includes plural through holes configured to receive the plural coil bars, respectively, and each of the plural base plates includes an inner surface located on an inner side thereof in the axial direction and an outer surface located on an outer side thereof in the axial direction, the plural end coil connections are disposed on the inner surface and on the outer surface.

8. The method of claim 7,
wherein the plural base plate assemblies are laminated together with another insulating member interposed therebetween between the first base plate and the second base plate.

9. The method of claim 7,
wherein an outside diameter of the second base plate is smaller than an outside diameter of the first base plate.

10. The stator of claim 1,
wherein an outside diameter of the second base plate is smaller than an outside diameter of the first base plate.

* * * * *